US012361900B2

(12) United States Patent
Orio et al.

(10) Patent No.: US 12,361,900 B2
(45) Date of Patent: Jul. 15, 2025

(54) LOCAL DIMMING FOR PANEL DISPLAY DEVICES USING ONE-DIMENSIONAL (1D) LIGHT SOURCE ARRAY

(71) Applicant: Synaptics Incorporated, San Jose, CA (US)

(72) Inventors: Masao Orio, Tokyo (JP); Takashi Nose, Kanagawa (JP); Hirobumi Furihata, Tokyo (JP); Tomoo Minaki, Tokyo (JP); Kazutoshi Aogaki, Kanagawa (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/503,424

(22) Filed: Nov. 7, 2023

(65) Prior Publication Data

US 2025/0149003 A1 May 8, 2025

(51) Int. Cl.
*G09G 3/34* (2006.01)
*G09G 3/36* (2006.01)

(52) U.S. Cl.
CPC ......... *G09G 3/3426* (2013.01); *G09G 3/3607* (2013.01); *G09G 2320/0247* (2013.01); *G09G 2320/0646* (2013.01); *G09G 2320/066* (2013.01); *G09G 2330/021* (2013.01); *G09G 2360/16* (2013.01)

(58) Field of Classification Search
CPC ............... G09G 3/3426; G09G 3/3607; G09G 2320/0247; G09G 2320/0646; G09G 2320/066; G09G 2330/021; G09G 2360/16
See application file for complete search history.

(56) References Cited

U.S. PATENT DOCUMENTS

| | | | | |
|---|---|---|---|---|
| 7,324,080 | B1 * | 1/2008 | Hu | G09G 3/3413 345/87 |
| 9,740,046 | B2 * | 8/2017 | Wyatt | G02F 1/133603 |
| 10,109,243 | B2 * | 10/2018 | Kang | G09G 3/3426 |
| 10,262,599 | B2 * | 4/2019 | Lang | G09G 3/3426 |
| 10,770,008 | B2 * | 9/2020 | Sako | G09G 3/3426 |
| 11,281,047 | B1 * | 3/2022 | Dunn | G09G 3/3426 |
| 11,315,503 | B1 * | 4/2022 | Liu | G09G 3/36 |
| 11,488,546 | B2 * | 11/2022 | Lee | G09G 3/3225 |
| 11,769,460 | B2 * | 9/2023 | Chan | G09G 3/3426 345/691 |

(Continued)

*Primary Examiner* — Benyam Ketema
(74) *Attorney, Agent, or Firm* — Leydig, Voit & Mayer, Ltd.

(57) ABSTRACT

A display device includes a backlight device, and a backlight control circuit. The backlight device includes a plurality of light sources configured to illuminate a plurality of zones of a display panel, respectively. The zones are aligned in a first direction, and each zone includes a plurality of subzones aligned in a second direction perpendicular to the first direction. The backlight control circuit is configured to receive an input image and determine a backlight value for a target light source of the light sources, the target light source corresponding to a target zone of the plurality of zones. Determining the backlight value for the target light source includes: determining local brightness values of respective subzones of the target zone based on the input image; and determining the backlight value for the target light source based on the local brightness values of the subzones of the target zone.

20 Claims, 26 Drawing Sheets

(56) References Cited

U.S. PATENT DOCUMENTS 11,929,041 B1 * 3/2024 Huang ................. G09G 3/3413
12,094,432 B1 * 9/2024 Furihata ............... G09G 3/3426
12,100,361 B1 * 9/2024 Furihata ............... G09G 3/3406
12,136,398 B2 * 11/2024 Furihata ............... G09G 3/3426
12,142,233 B1 * 11/2024 Furihata ............... G09G 3/3426
2005/0237292 A1 * 10/2005 Kim ..................... G09G 3/3426 345/102
2007/0247871 A1 * 10/2007 Yoo ...................... G02B 6/0078 362/612
2008/0278432 A1 * 11/2008 Ohshima .............. G09G 3/3426 345/102
2010/0066752 A1 * 3/2010 Watanuki ............. G09G 3/3426 345/589
2010/0073276 A1 * 3/2010 Koike .................. G09G 3/3426 345/102
2010/0309109 A1 * 12/2010 Won ..................... G09G 3/3426 345/102
2011/0090141 A1 * 4/2011 Liao ....................... G02B 6/008 362/97.1
2011/0141090 A1 * 6/2011 Hong ................... G09G 3/3426 345/102
2011/0285758 A1 * 11/2011 Matsushita .......... G09G 3/3426 345/87
2012/0075326 A1 * 3/2012 Tsuchiya .............. G02B 6/0058 345/589
2012/0105441 A1 * 5/2012 Park ....................... G09G 3/342 345/694
2014/0285535 A1 * 9/2014 Pyo ...................... G09G 3/3291 345/77
2015/0010248 A1 * 1/2015 Chuang ..................... G06T 5/90 382/274
2017/0336676 A1 * 11/2017 Harada ................ G09G 3/2022
2017/0365225 A1 * 12/2017 Yoneyama ........ G02F 1/133606
2019/0005872 A1 * 1/2019 Newton ................. G02B 27/30
2023/0274710 A1 * 8/2023 Chen ........................ G09G 3/32 345/690

* cited by examiner

| Operation Cycle | #1 | #2 | #3 | #4 | #5 | #6 | #7 | #8 |
|---|---|---|---|---|---|---|---|---|
| Local Brightness Value Output | B[1] | B[2] | B[3] | B[4] | B[5] | B[6] | B[7] | B[8] |
| FF0 | | B[1] | B[2] | B[3] | B[4] | B[5] | B[6] | B[7] |
| FF1 | | | B[1] | B[2] | B[3] | B[4] | B[5] | B[6] |
| Averaged Local Brightness Value | | | | Bave[1] $= \frac{B[1]+B[2]}{2}$ | Bave[2] $= \frac{B[2]+B[3]}{2}$ | Bave[3] $= \frac{B[3]+B[4]}{2}$ | Bave[4] $= \frac{B[4]+B[5]}{2}$ | Bave[5] $= \frac{B[5]+B[6]}{2}$ |
| Maximum Value Stored in FF3 | | | | | m = max (m, Bave[1]) | m = max (m, Bave[2]) | m = max (m, Bave[3]) | m = max (m, Bave[4]) |

FIG. 14

LOCAL DIMMING FOR PANEL DISPLAY DEVICES USING ONE-DIMENSIONAL (1D) LIGHT SOURCE ARRAY

TECHNICAL FIELD

This disclosure relates generally to panel display devices, and more particularly to local dimming for panel display devices using a one-dimensional (1D) light source array.

BACKGROUND

Panel display devices with a light-transmissive display panel (e.g., a light-transmissive liquid crystal display (LCD) panel) may incorporate a backlight device that illuminates the light-transmissive display panel. Modern backlight devices, such as direct-lit backlights, full-array backlights etc., may be configured to illuminate a display panel with a two-dimensional (2D) array of light sources (e.g., light-emitting diodes (LEDs)). The use of a 2D light source array in a backlight device enables the implementation of a local dimming function that can achieve high dynamic contrast and low power consumption by individually controlling the respective light sources of the 2D light source array according to input image data.

The use of a 2D light source array in a panel display device may however undesirably increase the volume of the panel display device, because the use of the 2D light source array, which is provided behind the display panel, inevitably increases the thickness of the panel display device. Accordingly, it would be advantageous to provide a technology capable of implementing a local dimming function with a reduced volume of the panel display device.

SUMMARY

This summary is provided to introduce a selection of concepts in a simplified form that are further described below. This summary is not necessarily intended to identify key features or essential features of the present disclosure. The present disclosure may include the following various aspects and embodiments.

In an exemplary embodiment, the present disclosure provides a display device that includes a display panel, a backlight device, and a backlight control circuit. The backlight device includes a plurality of light sources configured to illuminate a plurality of zones of the display panel, respectively. The plurality of zones are aligned in a first direction, and each of the plurality of zones includes a plurality of subzones aligned in a second direction perpendicular to the first direction. The backlight control circuit is configured to receive an input image and determine a backlight value for a target light source of the plurality of light sources, the target light source corresponding to a target zone of the plurality of zones. Determining the backlight value for the target light source includes: determining local brightness values of respective subzones of the target zone based on the input image; and determining the backlight value for the target light source based on the local brightness values of the subzones of the target zone.

In another exemplary embodiment, the present disclosure provides a display driver that includes a driver circuit and a backlight control circuit. The driver circuit is configured to drive a display panel based on an input image. The display panel is illuminated by a backlight device that includes a plurality of light sources aligned in a first direction and configured to illuminate a plurality of zones of the display panel, respectively. Each of the plurality of zones includes a plurality of subzones aligned in a second direction perpendicular to the first direction. The backlight control circuit is configured to determine a backlight value for a target light source of the plurality of light sources, the target light source corresponding to a target zone of the plurality of zones. Determining the backlight value for the target light source includes: determining local brightness values of the respective subzones of the target zone based on the input image; and determining the backlight value for the target light source based on the local brightness values of the subzones of the target zone.

In yet another exemplary embodiment, the present disclosure provides a method. A method includes illuminating, by a backlight device including a plurality of light sources, a plurality of zones of a display panel, respectively. The plurality of zones is aligned in a first direction, each of the plurality of zones including a plurality of subzones aligned in a second direction perpendicular to the first direction. The method further includes receiving an input image and determining a backlight value for a target light source of the plurality of light sources, the target light source corresponding to a target zone of the plurality of zones. Determining the backlight value for the target light source includes: determining local brightness values of the respective subzones of the target zone based on the input image; and determining the backlight value for the target light source based on the local brightness values of the subzones of the target zone.

Other features and aspects are described in more detail below with reference to the attached drawings.

BRIEF DESCRIPTION OF THE DRAWINGS

FIG. 14 is a timing diagram showing an example operation of the 1D module shown in FIG. 13, according to one or more embodiments.

Figure 1:
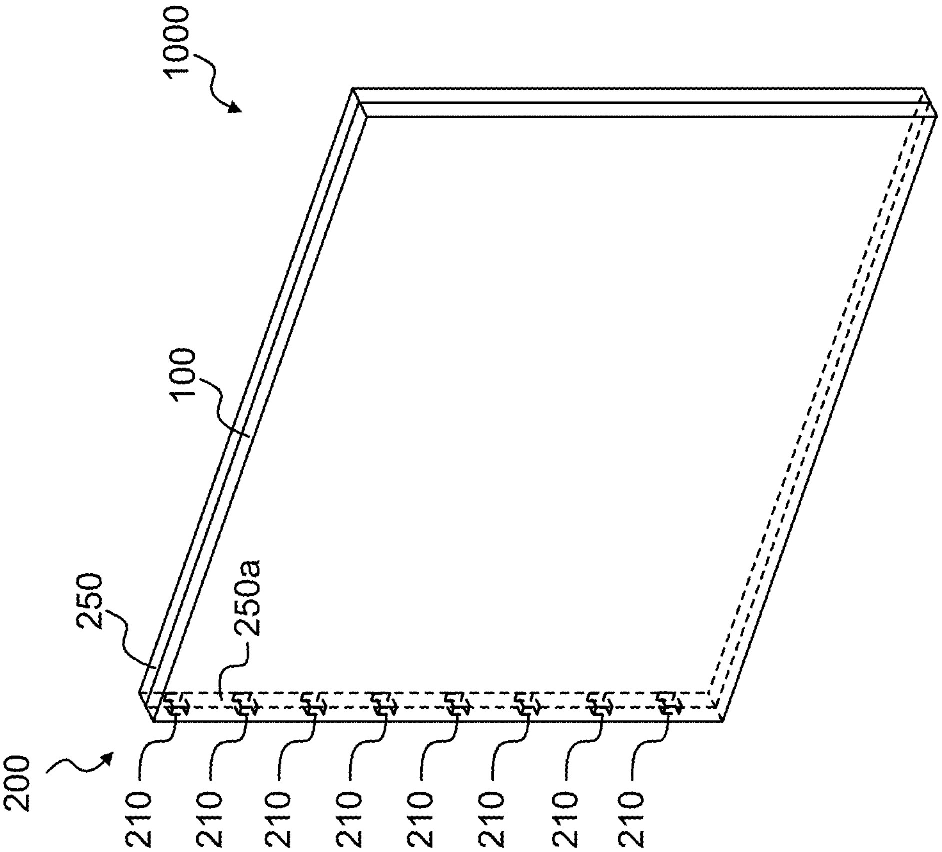
FIG. 1 shows an example configuration of a panel display device, according to one or more embodiments.

For ease of understanding, where possible, identical reference numerals have been used to designate elements that are common to the figures. It is contemplated that elements disclosed in one embodiment may be utilized in other embodiments without specific recitation. Suffixes may be appended to reference numerals to distinguish elements from one another. The drawings referenced herein are not to be construed as being drawn to scale unless specifically noted. In addition, the drawings are often simplified and details or components are omitted for clarity of presentation and explanation. The drawings and discussion are intended to explain principles discussed below.

DETAILED DESCRIPTION

The following detailed description is exemplary in nature and is not intended to limit the disclosure or the applications and uses of the disclosure. Further, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail so as not to unnecessarily complicate the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As discussed above, a modern backlighting system, such as a direct-lit backlight, a full-array backlight etc., may be configured to illuminate a display panel with a two-dimensional (2D) array of light sources (e.g., light emitting diodes (LEDs)) to achieve a local dimming function, which can realize high dynamic contrast by individually controlling the respective light sources of the 2D light source array according to input image data. The use of a 2D light source array in a panel display device may however undesirably increase the volume of the panel display device, because the 2D light source array, which is provided behind the display panel, inevitably increases the thickness of the panel display device.

The present disclosure recognizes that the local dimming function can be implemented in an edge-lit panel display device that uses a one-dimensional (1D) light source array configured to illuminate the display panel from its edge. The use of the edge lighting configuration to illuminate the display panel may enable a reduction in the thickness of the panel display system, thereby facilitating a reduction in the volume of the panel display system. The local dimming function based on a 1D light source array may however raise different issues than that based on a 2D light source array. The following describes various embodiments for appropriately controlling the brightness levels of light sources of a 1D light source array to achieve the local dimming function in an edge-lit panel display device.

FIG. 1 shows an example configuration of an edge-lit panel display device 1000, according to one or more embodiments. In the shown embodiment, the panel display device 1000 includes a display panel 100 and a 1D backlight device 200. The display panel 100 may be a light-transmissive display panel such as a liquid crystal display (LCD) panel. The 1D backlight device 200 includes a 1D array of light sources 210 and a light diffusion plate 250 that has a major surface attached to the rear surface of the display panel 100. The light sources 210 are aligned in a given direction (the vertical direction in FIG. 1) and coupled to a side surface 250*a* of the light diffusion plate 250. The light sources 210 may each include one or more light emitting diodes (LEDs) or other types of light emitting elements. Light beams emitted from the light sources 210 enter the side surface of the light diffusion plate 250 and spread across the major surface of the light diffusion plate 250 to illuminate the display panel 100.

The brightness levels of the respective light sources 210 of the 1D backlight device 200 may be determined based on "zones" defined by segmenting the display panel 100. In one or more embodiments, "zones" of the display panel 100 are defined for the respective light sources 210 such that the "zones" are respectively illuminated by the light sources 210. To achieve the local dimming function, the brightness levels of the respective light sources 210 may be controlled based on average picture levels (APLs) of images displayed in the corresponding zones.

Figure 2:
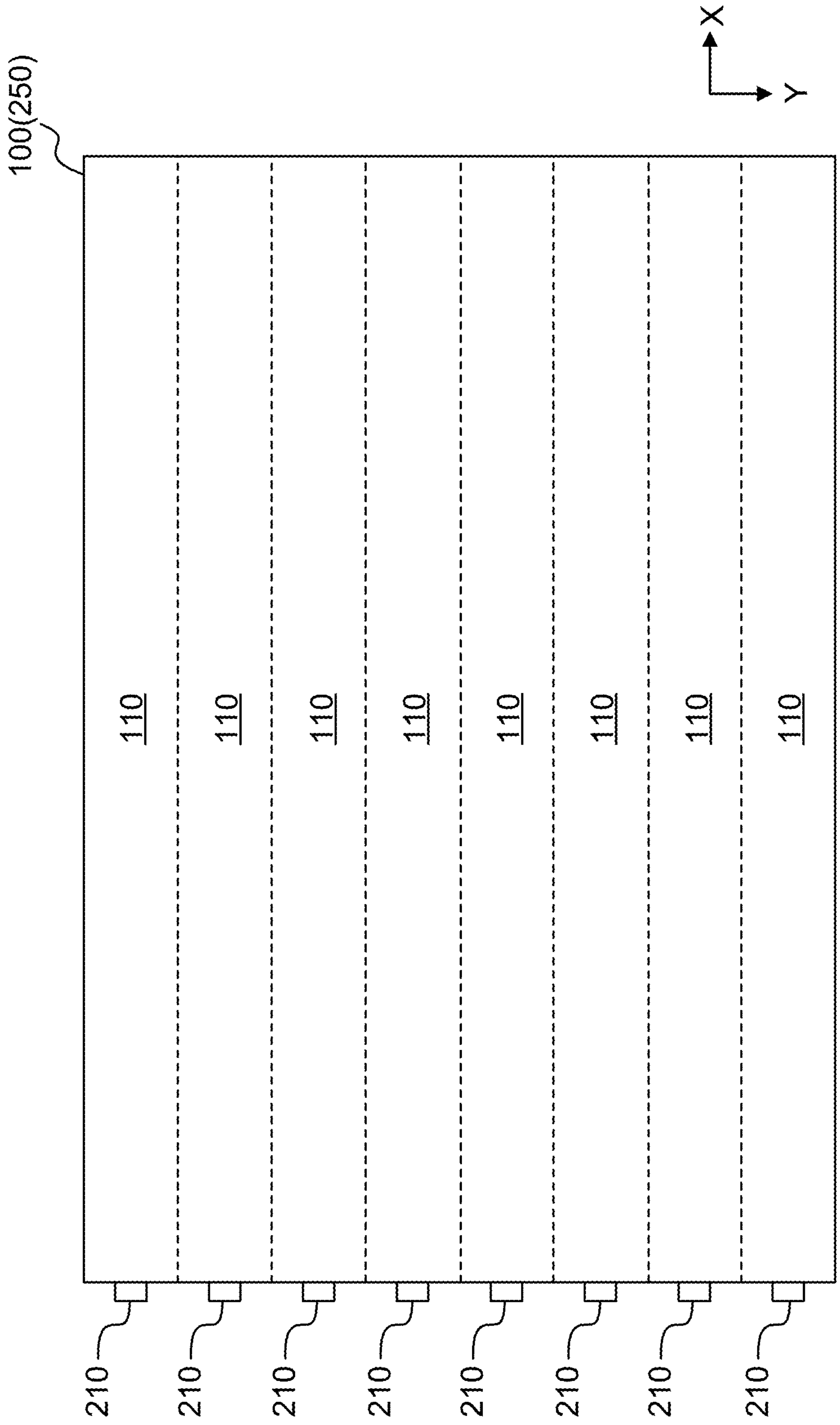
FIG. 2 shows an example arrangement of zones of a display panel, according to one or more embodiments.

FIG. 2 shows an example arrangement of zones 110 of the display panel 100, according to one or more embodiments. It is noted that directions may be indicated using a Cartesian XY coordinate system, where the X axis is oriented in the horizontal direction of the display panel 100 and the Y axis is oriented in the vertical direction of the display panel 100. The zones 110 are defined such that the respective light sources 210 illuminate the corresponding zones 110. In the shown embodiment, the zones 110 are vertically aligned (or aligned in a first direction) and the horizontal width of each zone 110 is the same as the horizontal width of the display panel 100. The zones 110 have a substantially rectangular shape extending in the horizontal direction (or a second direction perpendicular to the first direction). The light sources 210 are each configured to emit light in the horizontal direction (or the second direction) to illuminate the entirety of the corresponding zone 110. It should be noted that due to the light diffusion characteristics of the light sources 210, each light source 210 primarily illuminates the corresponding zone 110, but may secondarily illuminate at least portions of the zones 110 adjacent to the corresponding zone 110.

Since the horizontal width of each zone 110 is the same as the horizontal width of the display panel 100, the vertical dimension (or vertical height) of each zone 110 is different from the horizontal dimension (or horizontal width) of each zone 110. In the embodiment shown in FIG. 2, each zone 110 is defined to be longer horizontally than vertically. In implementations where the brightness levels of the respective light sources 210 are controlled based on average picture levels (APLs) of images displayed in the corresponding zones 110, the difference between the vertical and horizontal dimensions of each zone 110 may cause undesirable changes in the brightness levels of image elements contained in the displayed image depending on the vertical and horizontal dimensions of the image elements.

Figure 3A:
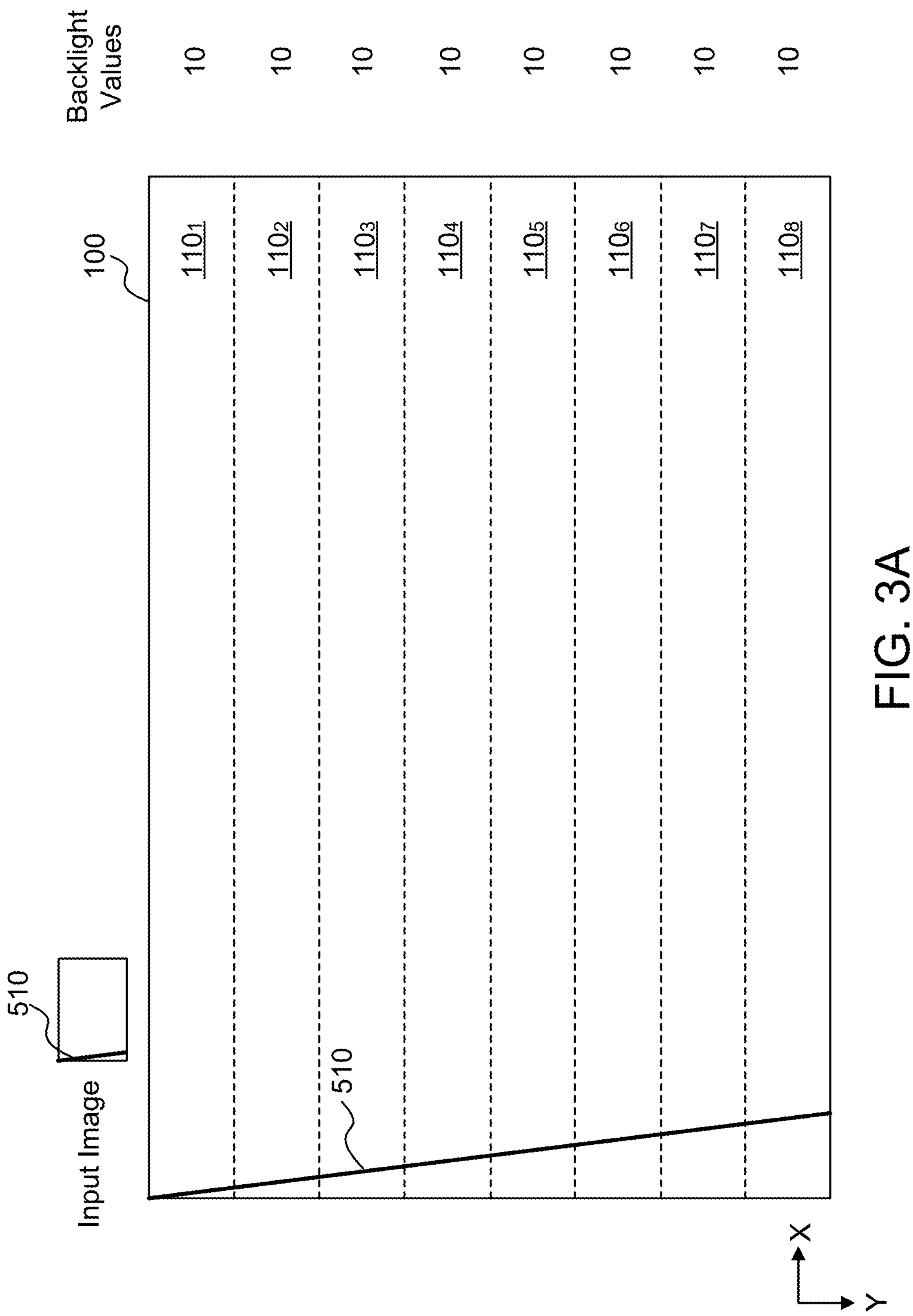
FIGS. 3A and 3B show example relationships between input images and backlight values of respective light sources.

FIG. 3A shows an example relationship between an input image and backlight values of the respective light sources 210, according to one or more examples of the present disclosure. It is noted that in FIG. 3A (and in the following figures), suffixes from one to eight are appended to the numerals "110" to distinguish the zones 110 from one another. In the shown example, the input image includes an image element 510 with the highest specified luminance level (indicated by the black color) in a background with the lowest specified luminance level (indicated by the white color). The image element 510 is an oblique line traversing the zones 1101 to 1108, where the vertical dimension of the image element 510 is greater than the horizontal dimension.

In one implementation, to achieve the local dimming function, the backlight values of the respective light sources 210 may be determined based on the APLs of the corresponding zones 110. The backlight value referred to herein may be a value that indicates the brightness level to which the light source 210 of interest is to be controlled. In the example shown in FIG. 3A, the backlight values of all of the light sources 210 are commonly determined to be the same value, e.g., "10", since the APLs of the zones 1101 to 1108 are the same.

Figure 3B:
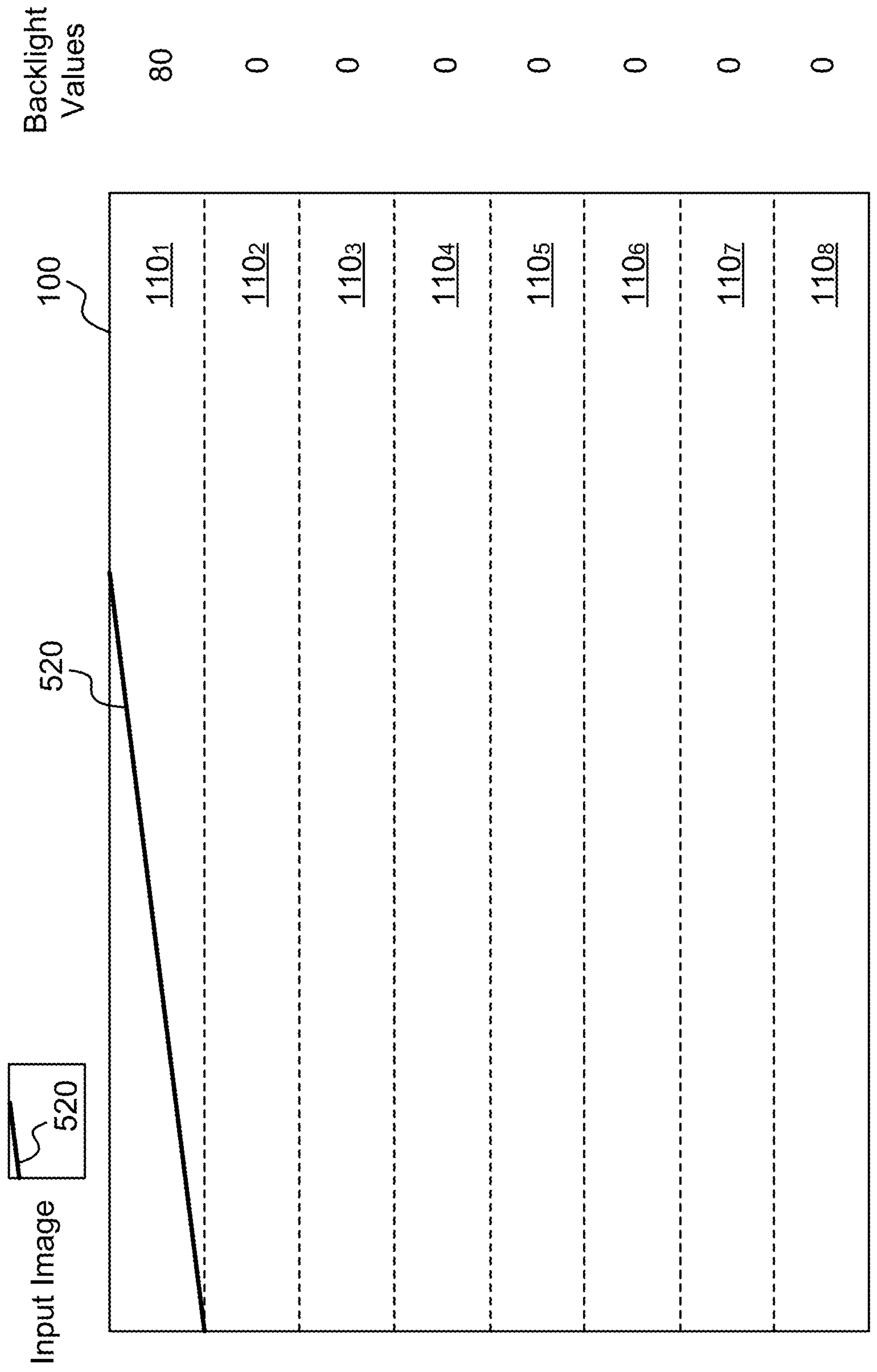

FIG. 3B shows another example relationship between an input image that includes an image element 520 and backlight values of the respective light sources 210, according to one or more examples of the present disclosure. In the shown example, the input image includes an image element 520 with the highest specified luminance level (indicated by the black color) in a background with the lowest specified luminance level (indicated by the white color). The image element 520 is a figure obtained by rotating the image element 510 shown in FIG. 3A by 90 degrees. Accordingly, the vertical dimension of the image element 520 is the same as the horizontal dimension of the image element 510 and the horizontal dimension of the image element 520 is the same as the vertical dimension of the image element 510. The entirety of the image element 520 is located in the zone 1101.

In one implementation, the backlight values of the respective light sources 210 may be determined based on the APLs of the corresponding zones 110 as is the case with FIG. 3A. In this case, the backlight values of the light sources 210 corresponding to the zones 1102 to 1108 are determined to be zero, while the backlight value of the light source 210 corresponding to the zone 1101 is determined to be a non-zero value "80" because the APL of the zone 1101 for the case of FIG. 3B is eight times the APL of the zones 1101 to 1108 for the case of FIG. 3A. Accordingly, the actual luminance of the image element 520 will be different from that of the image element 510. The results shown in FIGS. 3A and 3B imply that determining the backlight values of the respective light sources 210 based on the APLs of the corresponding zones 110 may cause undesirable changes in the luminance of image elements depending on the vertical and horizontal dimensions of the image elements.

The present disclosure recognizes that the undesirable changes of image elements depending on the vertical and horizontal dimensions of the image elements result from the fact that the aspect ratio of the zones 110 is large. The aspect ratio referred to herein is the ratio of the larger of the horizontal width and vertical height of the zones 110 to the smaller of the horizontal width and vertical height. For example, in the zone arrangement shown in FIG. 2, the horizontal width of the zones 110 is much larger than the vertical height of the zones 110, and therefore the aspect ratio of the zones 110 is much larger than one. Due to the large aspect ratio of the zones 110, image elements oriented in different directions result in different backlight values of the light sources 210, causing an undesirable luminance difference of the image elements. This may undesirably deteriorate the image quality. In the following, various embodiments are presented which achieve improved image quality in panel display devices based on 1D backlight devices.

Figure 4A:
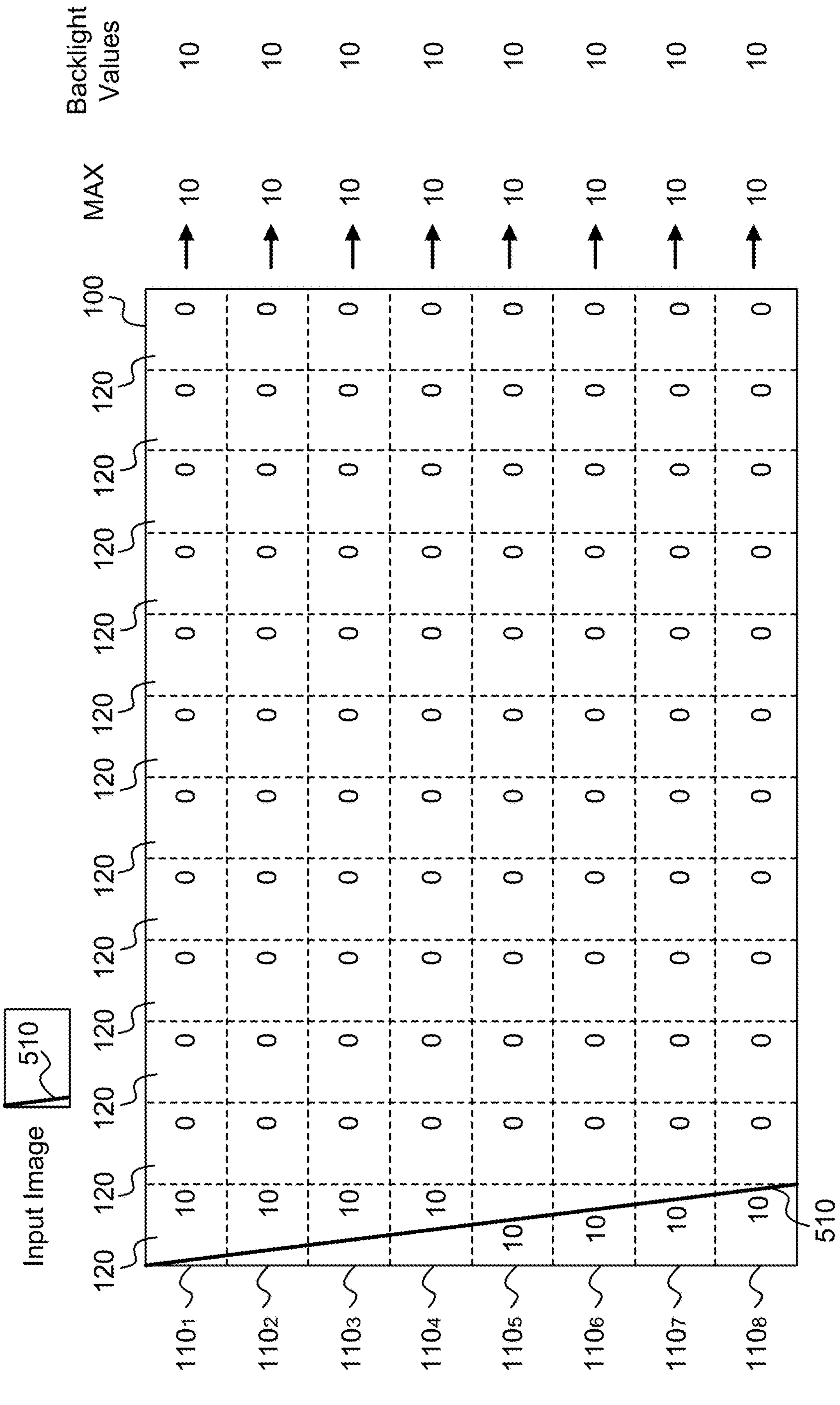
FIGS. 4A and 4B show an example process for determining backlight values for respective light sources.
Figure 4B:
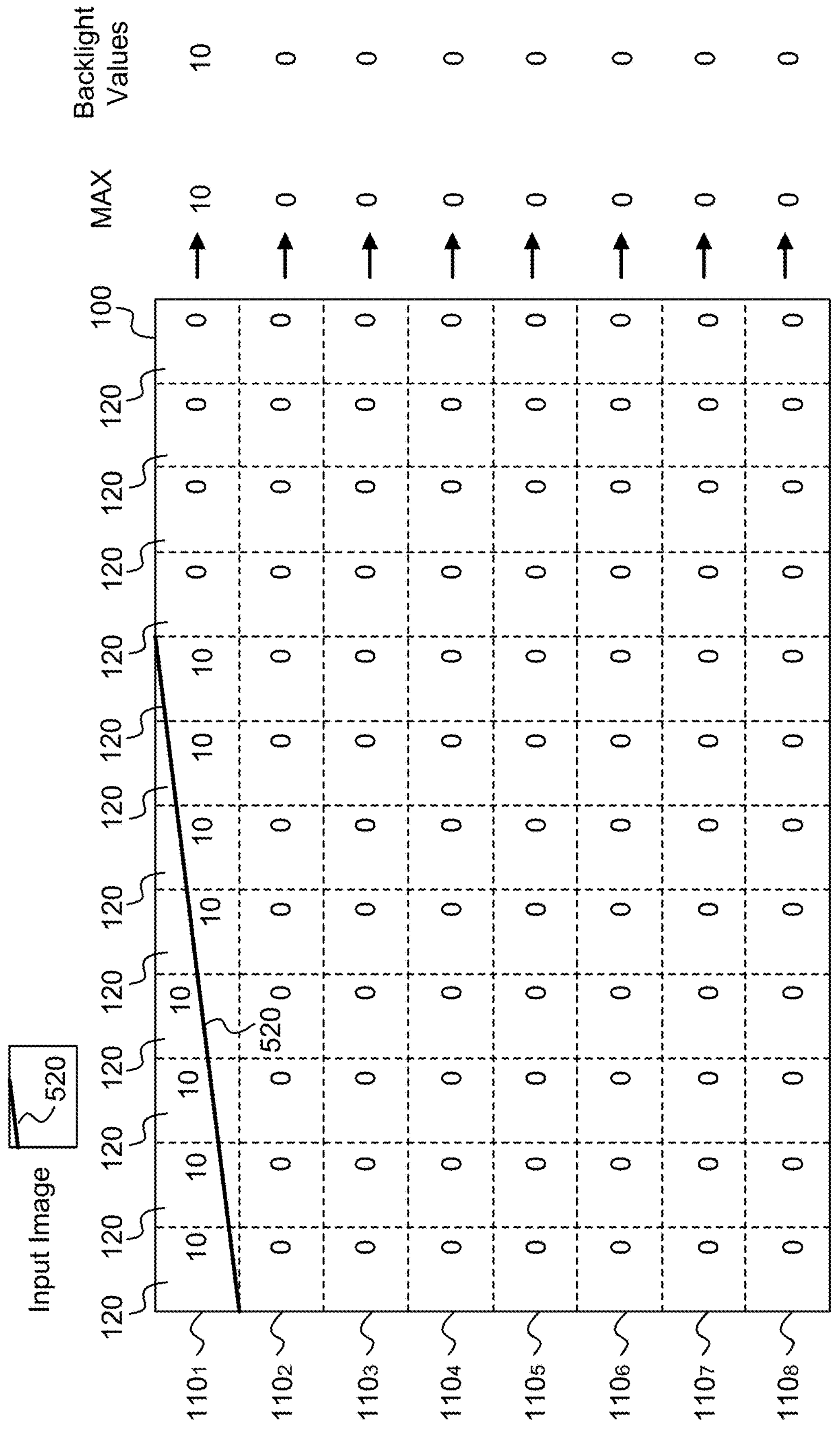

In one or more embodiments, to address undesirable changes in the luminance of image elements depending on the vertical and horizontal dimensions of the image elements, the backlight values of the respective light sources 210 may be determined based on "subzones" 120 defined by segmenting each zone 110 such that the subzones 120 have a substantially rectangular shape. In one or more embodiments, the aspect ratio of the subzones 120 is closer to one than the aspect ratio of the zones 110 as shown in FIGS. 4A and 4B. In one implementation, the subzones 120 have a substantially square shape. The use of the subzones 120 with an aspect ratio equal to or close to one may effectively mitigate undesirable changes in the luminance of image elements depending on the vertical and horizontal dimensions of the image elements. In the shown embodiment, each zone 110 contains 12 horizontally aligned subzones 120. In other embodiments, each zone 110 may contain fewer or more than 12 horizontally aligned subzones 120.

In one or more embodiments, the backlight value of a light source 210 of interest may be determined as follows. The APLs of the subzones 120 of the zone 110 corresponding to the light source 210 of interest may first be calculated, and the maximum APL for that zone 110, i.e., the maximum value of the APLs of the subzones 120 of that zone 110, may then be determined. The backlight value of the light source 210 of interest may be determined based on the maximum APL of the zone 110 corresponding to that light source 210. In one implementation, the backlight value of the light source 210 of interest may be determined to be proportional to the maximum APL of the corresponding zone 110.

FIG. 4A shows examples of the maximum APLs of the respective zones 110 and the backlight values determined for the respective light sources 210 for the input image containing the image element 510, according to one or more examples of the present disclosure. In the shown example, the image element 510 is located in the leftmost column of the subzones 120. The APLs of the leftmost subzones 120 of the respective zones 110 are calculated as "10", for example, and the APLs of other subzones 120 are calculated as "0". Accordingly, the maximum APLs of all zones 110 are determined to be "10", and the backlight values of all light sources 210 are determined to be "10". The image element 510 is displayed by the light sources 210 with the backlight value of "10".

FIG. 4B shows the maximum APLs of the respective zones 110 and the backlight values determined for the respective light sources 210 for the input image containing the image element 520, according to one or more examples of the present disclosure. In the shown example, the image element 520 is located in the leftmost eight subzones 120 of the zone 1101. The APLs of the leftmost eight subzones 120 of the zone 1101 are calculated as "10", for example, and the APLs of other subzones 120 are calculated as "0". Further, the maximum APL of the zone 1101 is determined as "10", and the maximum APLs of other zones 1102 to 1108 are determined to be "0". The backlight value of the light source 210 corresponding to the zone 1101 is determined to be "10" and the backlight values of other light sources 210 are determined to be "0". Accordingly, the image element 520 is displayed by the light source 210 corresponding to the zone 1101 with the backlight value of "10". The results shown in FIGS. 4A and 4B indicate that the determination scheme based on the subzones 120 effectively mitigates undesirable changes in the luminance of image elements depending on the vertical and horizontal dimensions of the image elements.

Figure 5A:
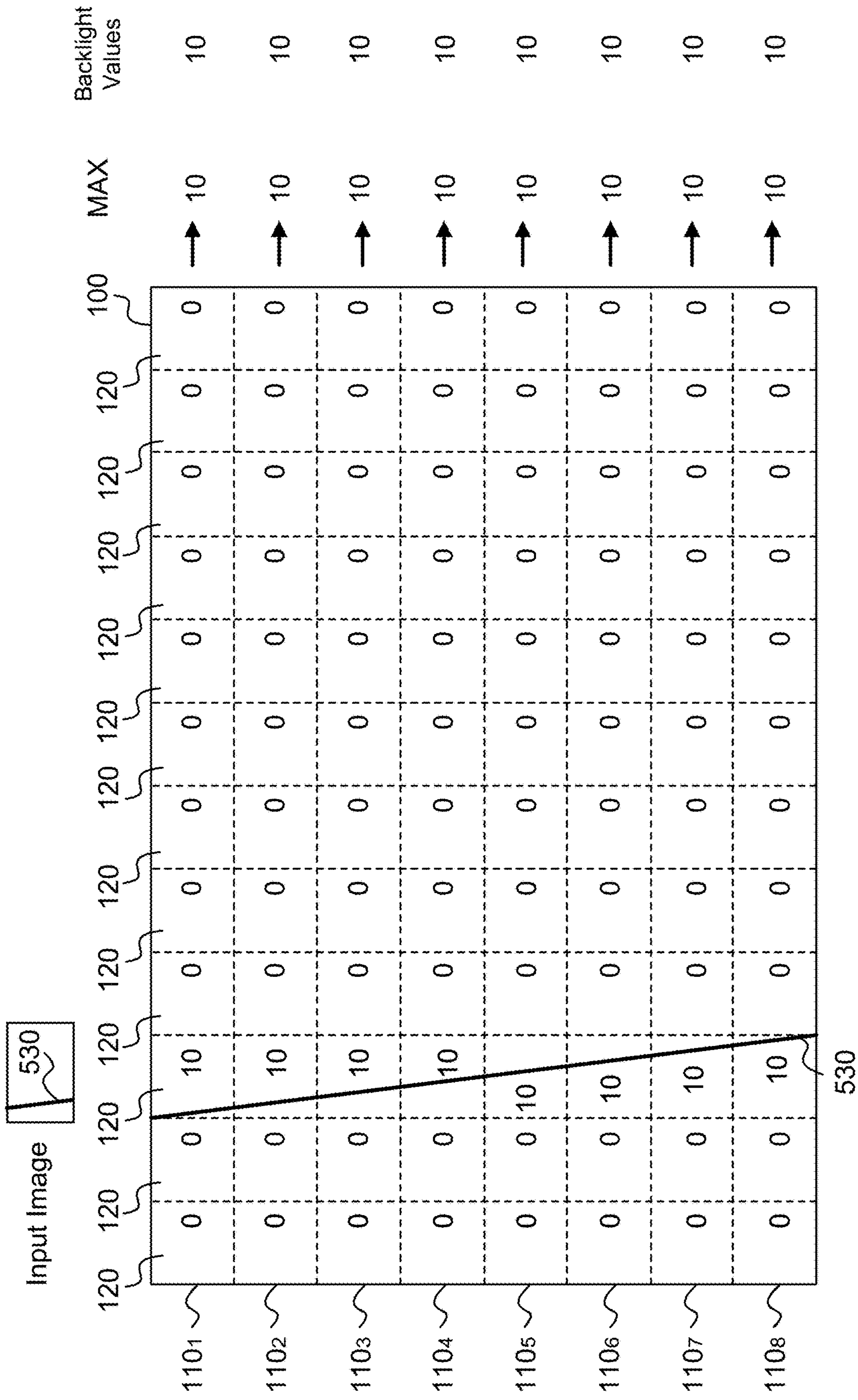
FIGS. 5A, 5B, and 5C show an example process for determining backlight values for respective light sources while an image element is moving.
Figure 5B:
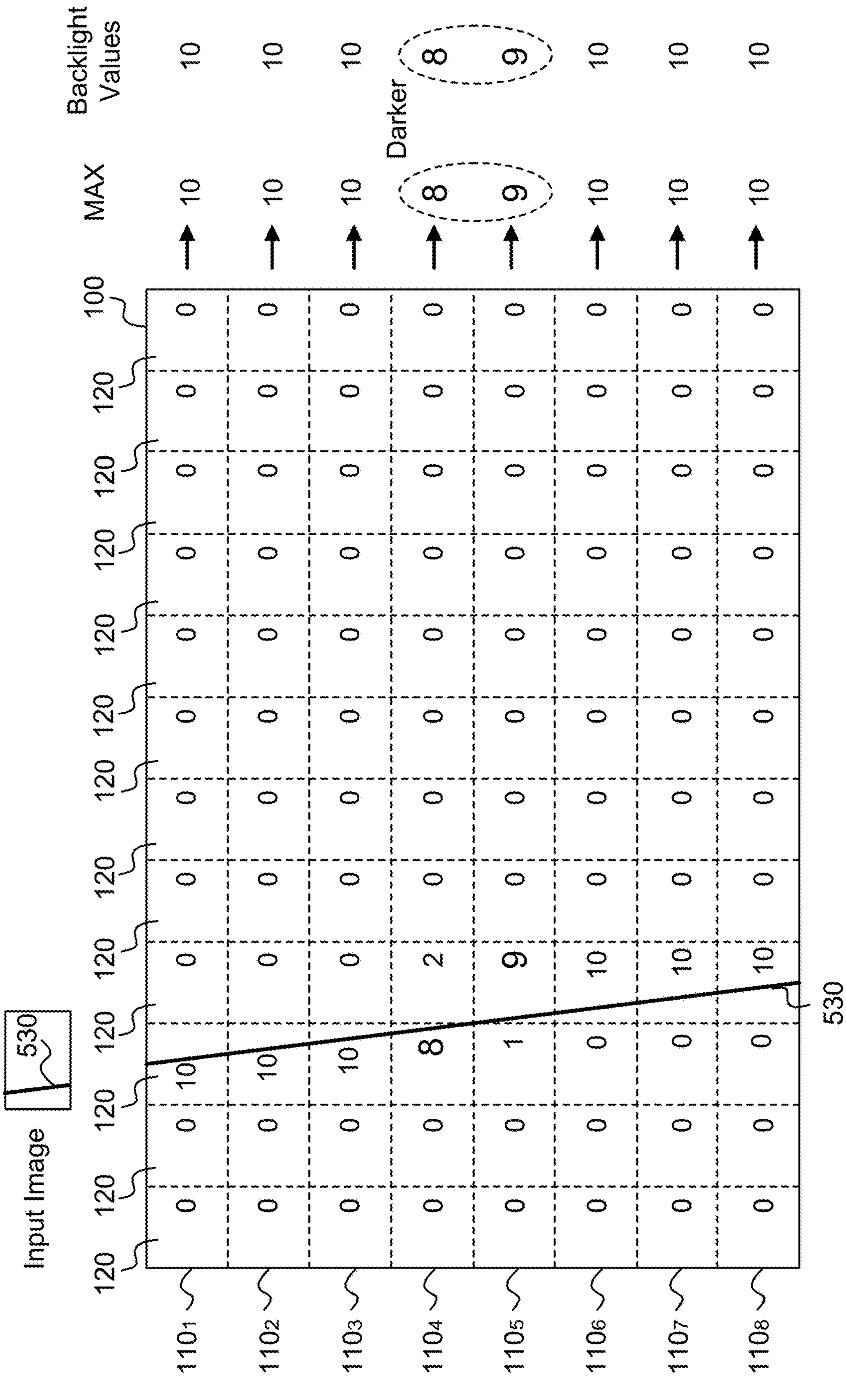
Figure 5C:
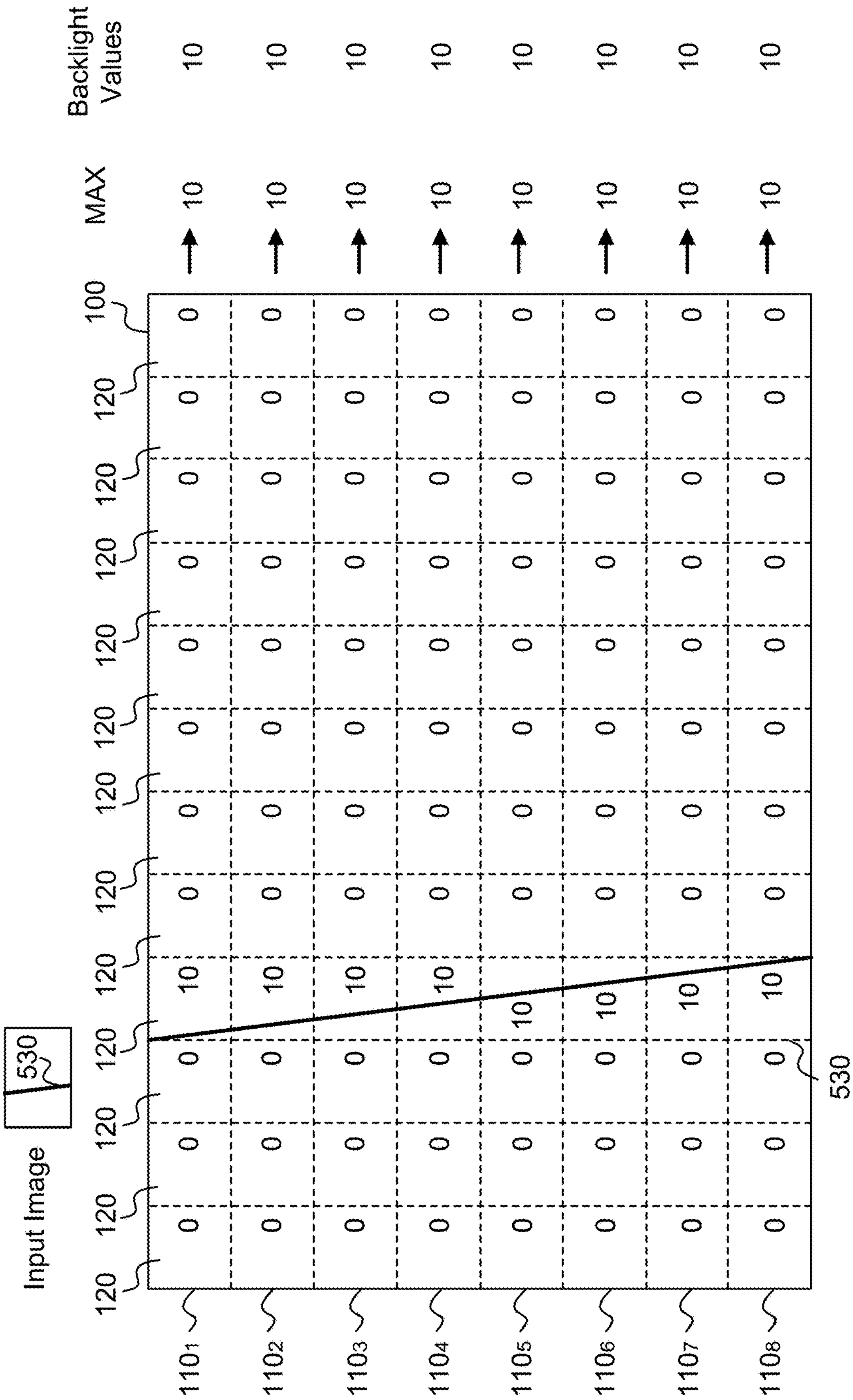

Although the above-described determination scheme based on the subzones 120 effectively mitigates undesirable changes in the luminance of image elements depending on the vertical and horizontal dimensions of the image elements, there is still room to further improve the image quality. More specifically, the above-described scheme based on the subzones 120 may cause an undesirable decrease in the luminance of an image element as the image element moves to cross a boundary between subzones 120. FIGS. 5A, 5B, and 5C show example changes in the luminance of an image element 530, according to one or more examples of the present disclosure.

Referring to FIG. 5A, the image element 530 is initially located in the third leftmost column of the subzones 120 of the display panel 100. In this case, the maximum APLs of all zones 110 are calculated to be "10" and the backlight values of all light sources 210 are determined to be "10". When the image element 530 crosses the boundaries between the third and fourth columns of the subzones 120 as shown in FIG. 5B, the maximum APLs of one or more of the zones 110 decrease, and therefore the backlight values of one or more of the light sources 210 also decrease. In the example shown in FIG. 5B, the APL of the third leftmost subzone 120 of the zone 1104 is calculated as "8", and the APL of the fourth leftmost subzone 120 of the zone 1105 is calculated as "9". Accordingly, the backlight values of the light sources 210 corresponding to the zones 1104 and 1105 are determined to be "8" and "9", respectively. When the entirety of the image element 530 becomes within the fourth column of the subzones 120 after crossing the boundary between the third and fourth columns of the subzones 120 as shown in FIG. 5C, the maximum APLs of all the zones 110 are calculated as "10" and the backlight values of all the light sources 210 are determined to be "10" as is the case with FIG. 5A. As shown in FIGS. 5A, 5B, and 5C, the movement of the image element 530 to cross the boundary between the third and fourth columns of the subzones 120 may undesirably cause a decrease in the luminance of the image element 530. In view of this, the following describes various embodiments for further appropriately determining backlight values for respective light sources of a 1D light source array to achieve a local dimming function in an edge-lit panel display device.

Figure 6:
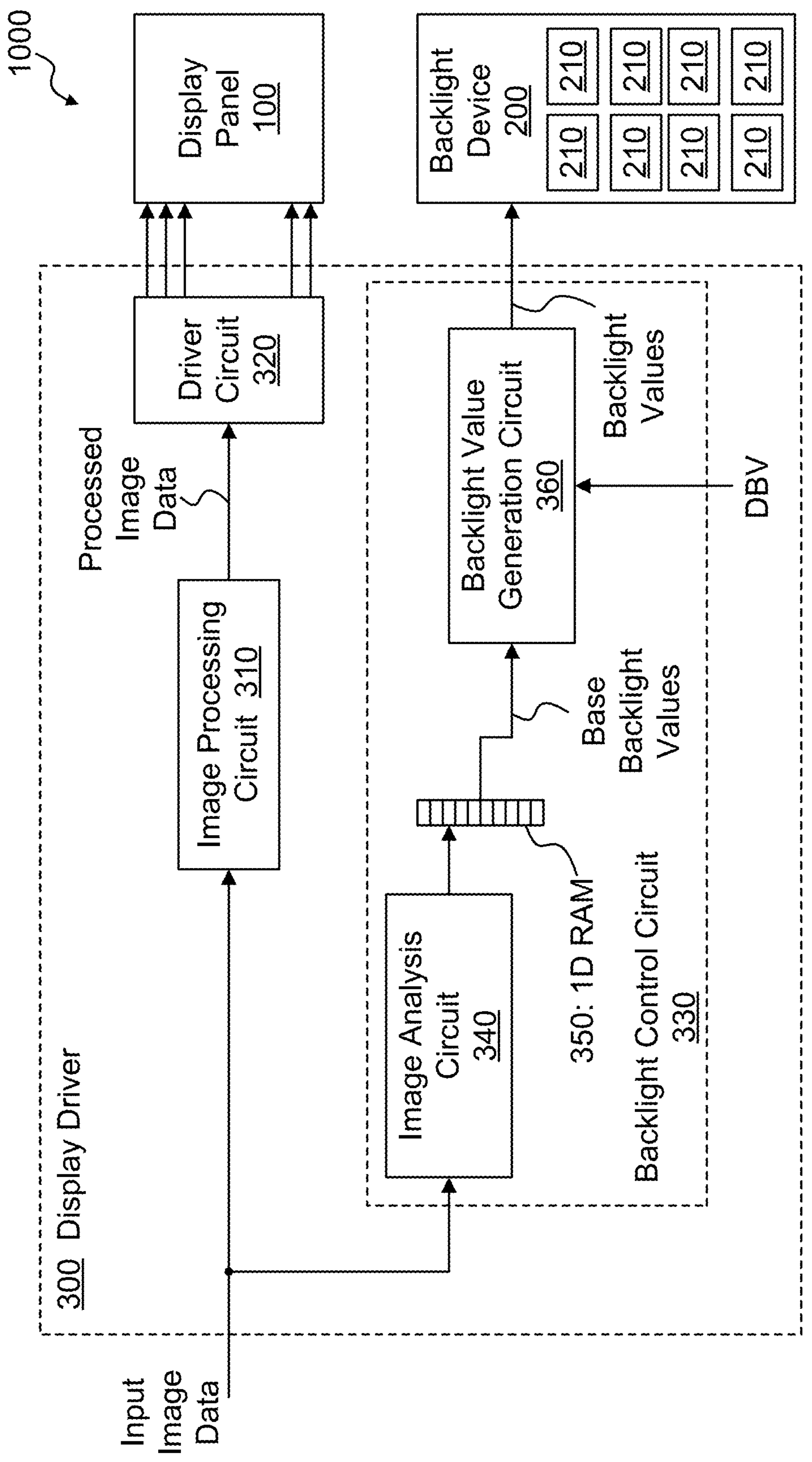
FIG. 6 shows an example configuration of a display driver, according to one or more embodiments.

FIG. 6 shows an example configuration of a display driver 300 of the panel display device 1000, according to one or more embodiments. The display driver 300 is configured to drive or update pixels of the display panel 100 based on input image data received from an external image source. The input image data corresponds to an input image and includes pixel data for the respective pixels of the display panel 100. The pixel data for a pixel may include graylevels of the respective primary colors (e.g., red, green, and blue) of the pixel. The display driver 300 is further configured to control the light sources 210 of the 1D backlight device 200.

In the shown embodiment, the display driver 300 includes an image processing circuit 310, a driver circuit 320, and a backlight control circuit 330. The image processing circuit 310 is configured to perform image processing on the input image data to generate processed image data. The image processing performed by the image processing circuit 310 may include color adjustment, demura correction, deburn correction, image scaling, gamma transformation, or other image processing. The driver circuit 320 is configured to drive or update the display panel 100 based on the processed image data.

The backlight control circuit 330 is configured to generate backlight values for the respective light sources 210 of the 1D backlight device 200 to individually control the light sources 210. The backlight value referred to herein may be a value indicating the brightness level to which the light source 210 of interest is to be controlled. To implement a local dimming function, the backlight control circuit 330 is configured to receive the input image data and determine the backlight values for the respective light sources 210 based on the input image data.

In the shown embodiment, the backlight control circuit 330 includes an image analysis circuit 340, a 1D random access memory (RAM) 350, and a backlight value generation circuit 360. The image analysis circuit 340 is configured to analyze the input image data to generate base backlight values for the respective light sources 210 based on the input image data. The image analysis circuit 340 is further configured to forward the base backlight values to the 1D RAM 350. The 1D RAM 350 is configured to store the base backlight values received from the image analysis circuit 340. The backlight value generation circuit 360 is configured to generate the backlight values for the respective light source 210 by modifying the base backlight values based on a display brightness value (DBV). The DBV referred to herein is a value that specifies a desired display brightness level of the panel display device 1000, wherein the display brightness level referred to herein is the overall brightness level of the display image displayed on the display panel 100. The DBV may be generated by an external controller based on a user operation. For example, when an instruction to adjust the display brightness level of the panel display device 1000 is manually input to an input device, the DBV may be generated based on this instruction. In one implementation, the backlight value generation circuit 360 may be configured to generate the backlight values for the respective light sources 210 by multiplying the base backlight values by a multiplication factor determined based on the DBV.

In some implementations, to mitigate display mura potentially caused by variations in the characteristics of the light sources 210, the backlight value generation circuit 360 may be further configured to store demura data and modify the base backlight values for the respective light sources 210 based on the demura data. The demura data may include demura compensation factors for the respective light sources 210. In such an implementation, the backlight value generation circuit 360 may be configured to apply the demura compensation factors to the base backlight values for the respective light sources 210 during the determination of the backlight values used to control the respective light sources 210. The backlight values thus generated are provided to the 1D backlight device 200 and used to control the respective light sources 210.

Figure 7:
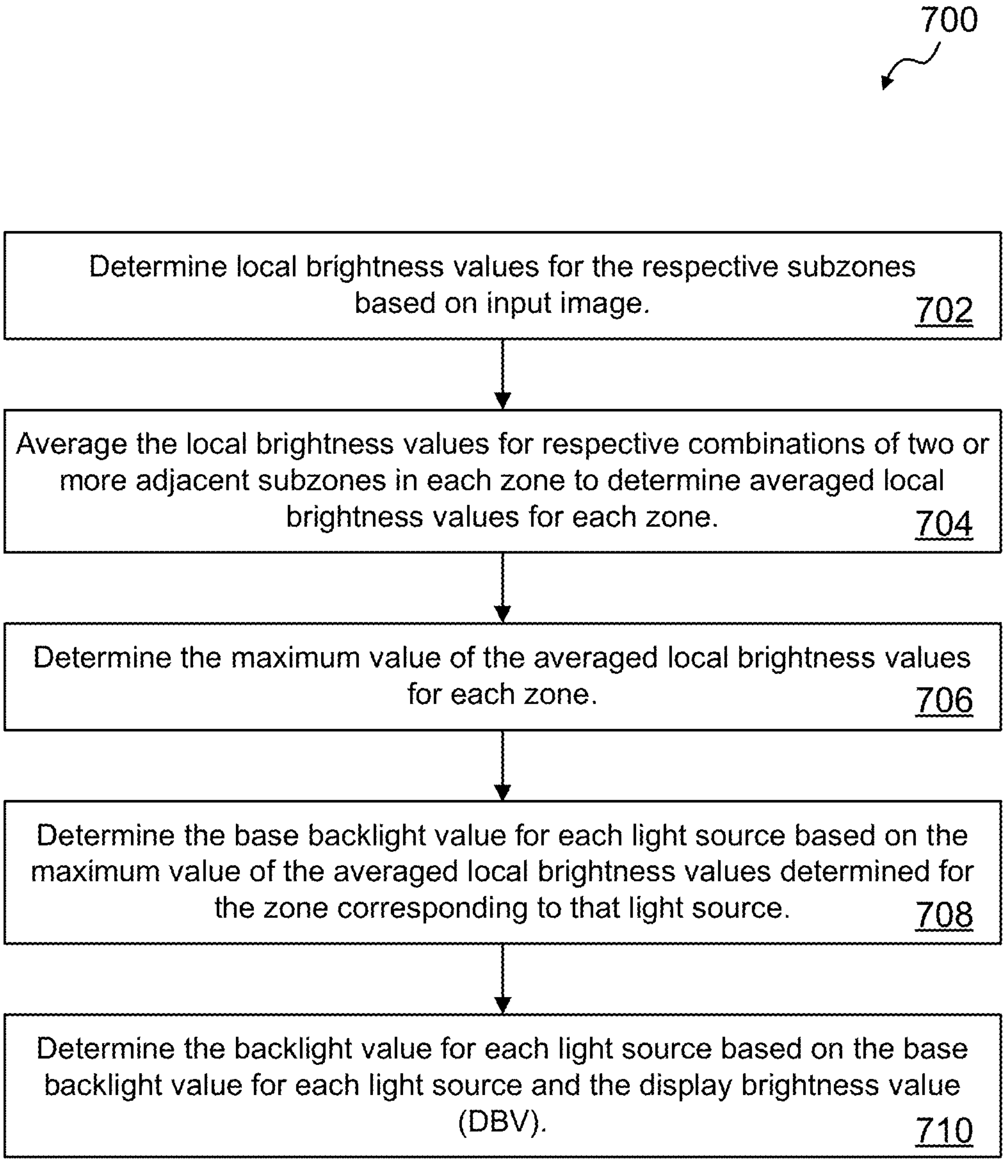
FIG. 7 is a flowchart showing an example process for determining backlight values for respective light sources, according to one or more embodiments.

FIG. 7 is a flowchart showing an example process 700 for determining the backlight values for the respective light sources 210 by the backlight control circuit 330, according to one or more embodiments. It will be appreciated that any of the following steps may be performed in any suitable order.

In step 702 of the process 700, the image analysis circuit 340 of the backlight control circuit 330 determines local brightness values of the respective subzones 120 based on the input image. The "local brightness value" for a subzone 120 of interest, as referred to herein, may be a value representing the brightness of that subzone 120. In some implementations, the local brightness value for a subzone 120 of interest may represent the brightness of that subzone 120 and also represent the brightness of the region around that subzone 120.

Figure 8:
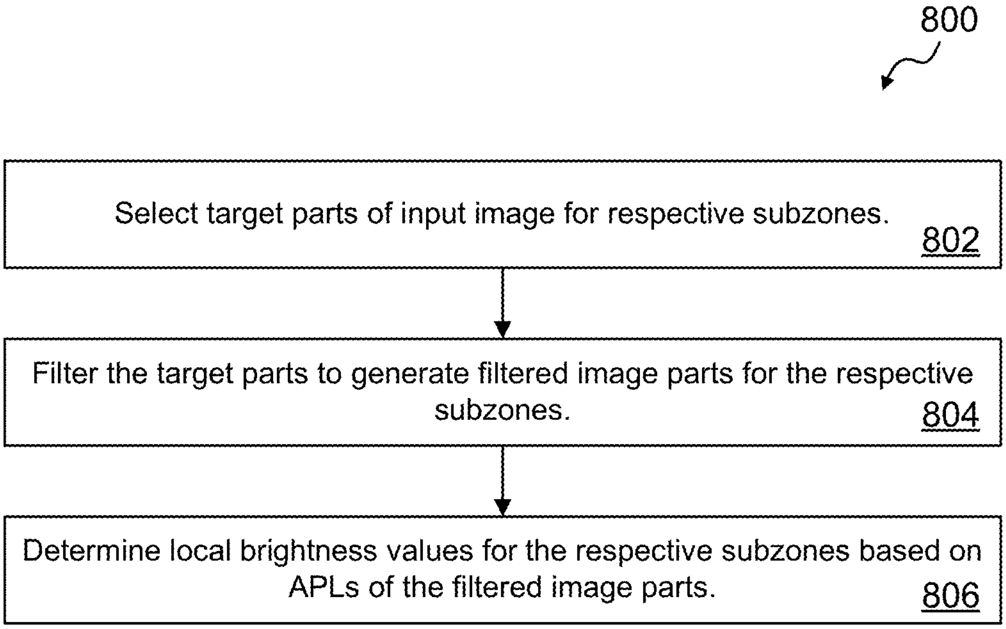
FIG. 8 is a flowchart showing an example process for determining local brightness values of respective subzones, according to one or more embodiments.

FIG. 8 is a flowchart showing an example process 800 for determining the local brightness values of the respective subzones 120, according to one or more embodiments. In one implementation, the process 800 is implemented by the image analysis circuit 340. It will be appreciated that that any of the following steps may be performed in any suitable order.

Figure 9A:
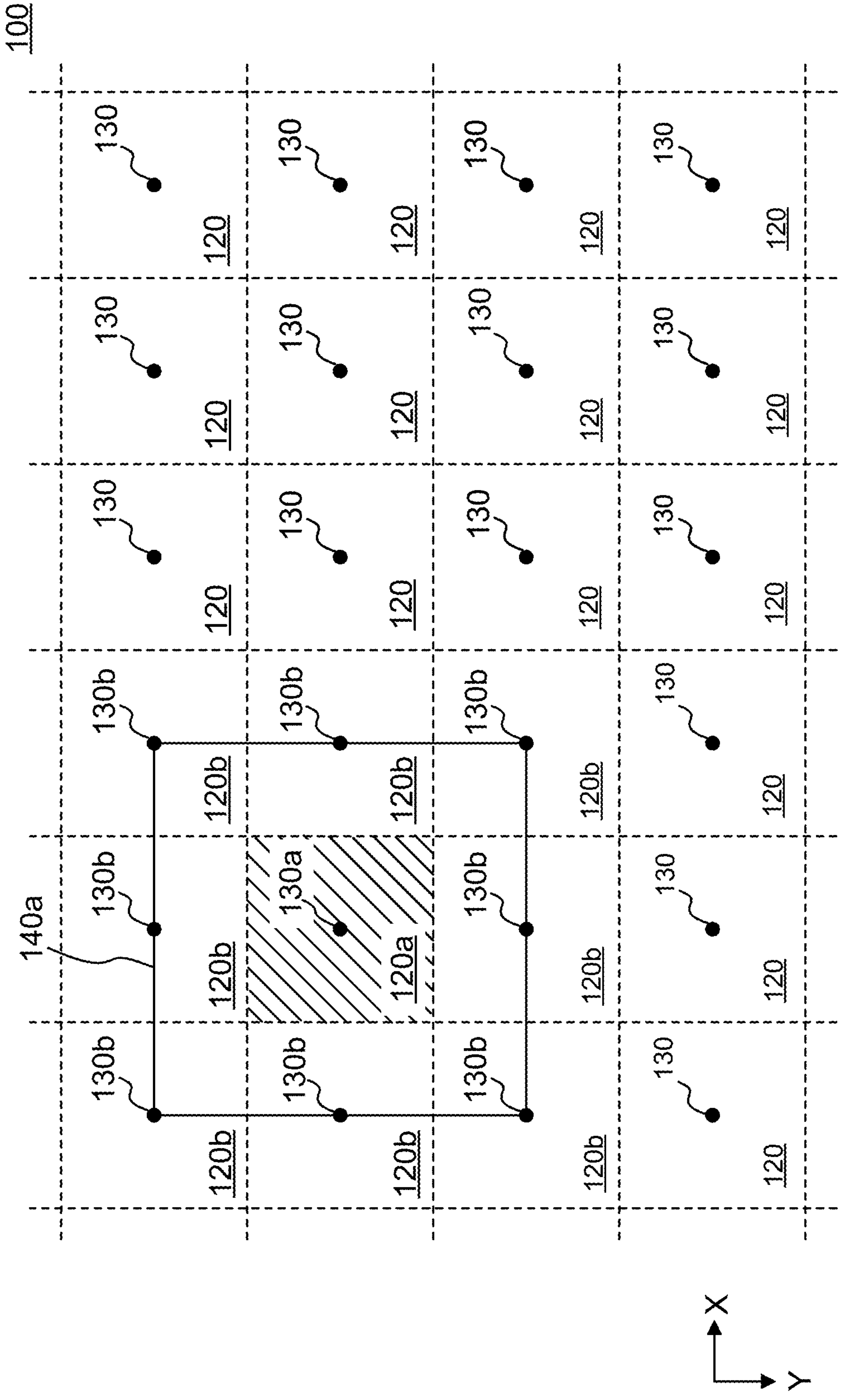
FIG. 9A shows an example selection of a target part of an input image for a subzone of interest, according to one or more embodiments.

In step 802, the image analysis circuit 340 selects target parts of the input image for the respective subzones 120. FIG. 9A shows an example selection of a target part of the input image for each subzone 120, according to one or more embodiments. In FIG. 9A, the numeral "120*a*" denotes a subzone 120 of interest and the numerals "120*b*" denote the eight subzones 120 adjacent to the subzone 120*a* of interest. The numerals "130" denote the centers (e.g., the geometric centers) of the subzones 120. The numeral "130*a*" denotes the center (e.g., the geometric center) of the subzone 120*a* of interest, and the numerals "130*b*" denote the centers (e.g., the geometric centers) of the subzones 120*b* adjacent to the subzone 120*a* of interest.

In one or more embodiments, the target part of the input image for the subzone 120*a* of interest is selected such that the target part is displayed in a corresponding region 140*a* of the display panel 100, wherein the corresponding region 140*a* is a substantially square region having a boundary that passes the centers of the eight subzones 120*b* adjacent to the subzone 120*a* of interest. The centers of four of the eight adjacent subzones 120*b* are at the four corners of the corresponding region 140*a* and the centers of the other four adjacent subzones 120*b* are on the four edges of the corresponding region 140*a*. The target parts of the input image for other subzones 120 may be selected in a manner similar to the target part for the subzone 120*a*. The target part for each subzone 120 may be selected differently, as long as the region of the display panel 100 in which the target part selected for each subzone 120 is displayed incorporates at least that subzone 120. It should be noted that target parts of the input image for adjacent subzones 120 may overlap. In the example shown in FIG. 9A, the height and width of each target part are both twice the height and width of a subzone 120, and the target part for the subzone 120*a* partially overlaps with target parts of its adjacent subzones 120*b*.

Referring back to FIG. 8, in step 804, the image analysis circuit 340 filters the target parts of the input image for the respective subzones 120 to generate filtered image parts for the respective subzones 120. In one or more embodiments, the filtering is based on a filter that include filter coefficients defined for the respective pixels of the target part of the input image, and the filtered image part is generated by applying the filter coefficients to pixel data of the respective pixels of the target part. In one implementation, the pixel data of the respective pixels of the filtered image part may be generated by multiplying the pixel data of the corresponding pixels of the target part by the filter coefficients defined for the corresponding pixels of the target part.

Figure 9B:
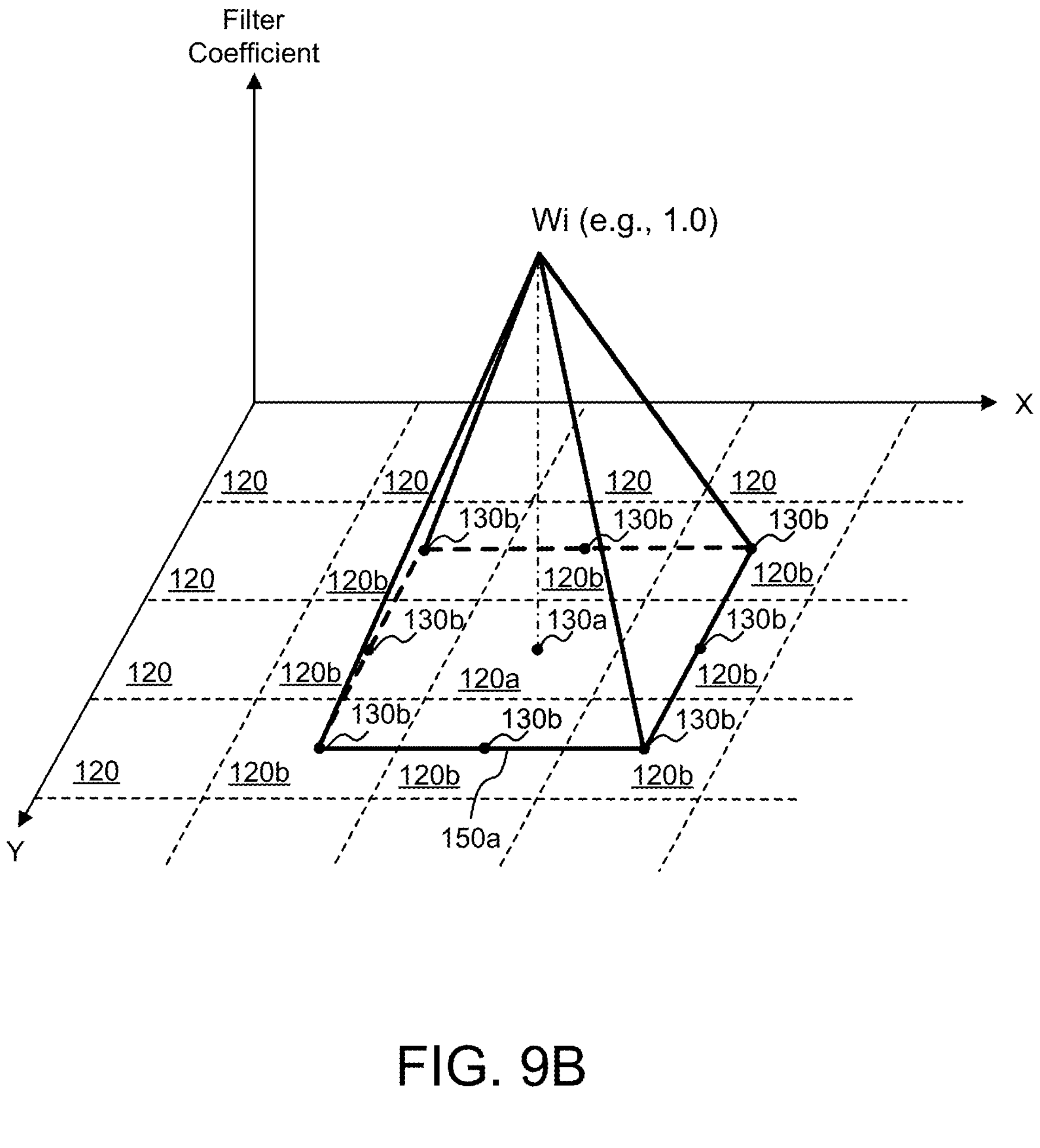
FIG. 9B shows example filter coefficients defined for pixels of the target part for the subzone of interest shown in FIG. 9A, according to one or more embodiments.

FIG. 9B shows example filter coefficients defined for the pixels of the target part for the subzone 120*a*, according to one or more embodiments, wherein the numeral "150*a*" denotes the target part for the subzone 120*a*. Shown in FIG. 9B is a part of the input image that includes the target part 150 for the subzone 120*a*. The numeral 130*a* denotes the center of the subzone 120*a*, and the numerals 130*b* denote the corresponding center positions of the adjacent subzones 120*b* in the input image. It is noted that the outer boundary of the target part 150*a* for the subzone 120*a* coincides with the boundary of the corresponding region 140*a* for the subzone 120*a* shown in FIG. 9A.

The filter coefficients defined for the pixels of the target part for the subzone 120*a* depend on the respective distances between the pixels of the target part of the input image and the center of the subzone 120*a* in the input image. In one implementation, the filter coefficients defined for the pixels of the target part for the subzone 120*a* increase as the respective distances between the pixels of the target part of the input image and the center of the subzone 120*a* in the input image decrease. In the shown embodiment, the filter coefficient for the pixel positioned at the center of the subzone 120*a* is Wi (e.g., 1.0), which is the maximum filter coefficient, and the filter coefficients for the pixels positioned at the outer boundary of the target part 150*a* are zero. The filter coefficients defined for other pixels of the target part for the subzone 120*a* are values between zero and Wi. The filter coefficients thus defined are applied to the pixel data of the respective pixels of the target part to generate the filtered image part. The filter coefficients for the pixels of other target parts for other subzones 120 may be defined in a manner similar to the filter coefficients defined for the pixels of the target part for the subzone 120*a* as shown in FIG. 9B.

Referring back to FIG. 8, in step 806, the image analysis circuit 340 analyzes the filtered image parts generated for the respective subzones 120 to determine the local brightness values of the respective subzones 120 based on the APLs of the filtered image parts. The APL of a filtered image part, which may also be referred to as the filtered image local APL, is the average of the pixel luminance levels of the filtered image part. In one implementation, the local brightness value for a subzone 120 is determined to be the same as the APL of the filtered image part generated for that subzone 120. Alternatively, the local brightness value for a subzone 120 may be determined by performing an arithmetic operation (e.g., multiplication, division, addition, subtraction etc.) on the APL of the filtered image part generated for that subzone 120.

Figure 10:
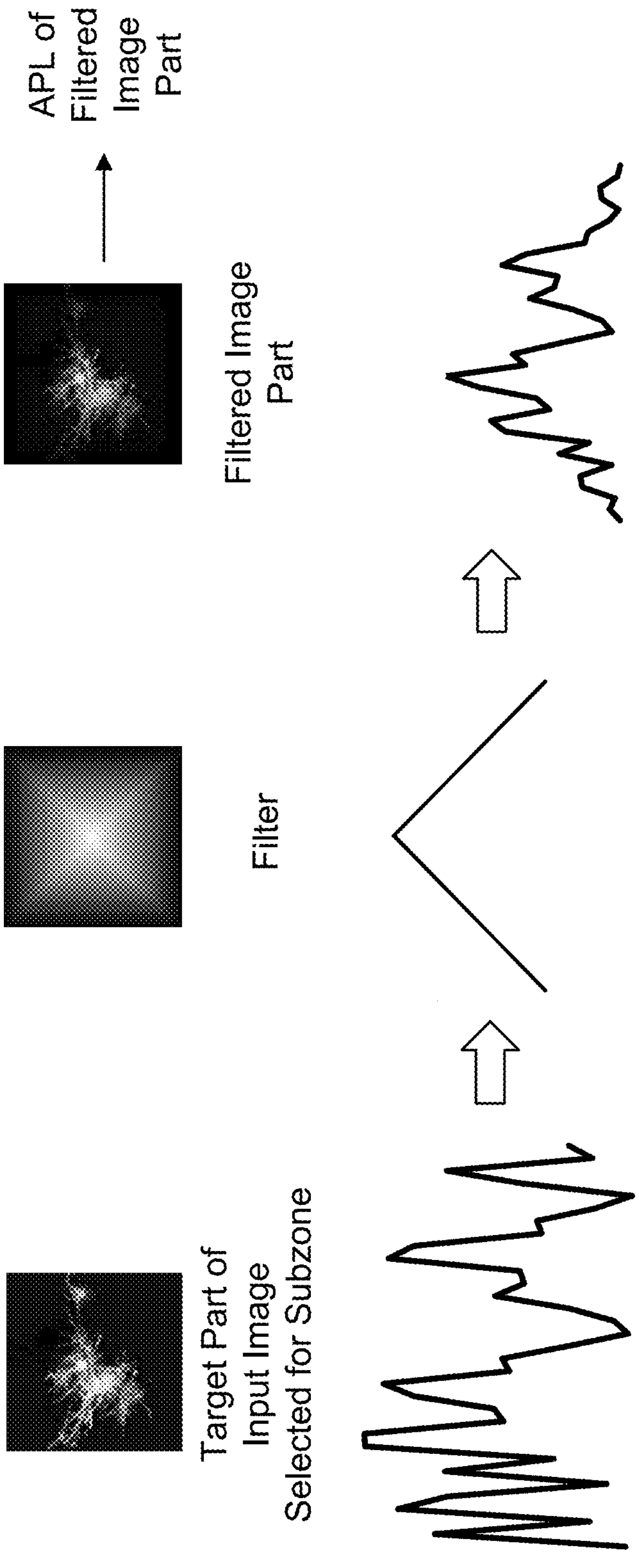
FIG. 10 shows an example of image processing performed in an image analysis circuit, according to one or more embodiments.

FIG. 10 shows a summary of the image processing performed in the image analysis circuit 340, according to one or more embodiments. The image analysis circuit 340 is configured to first select the target part of the input image for each subzone 120. As discussed above, the target part of the input image for each subzone 120 is selected such that the target part is displayed in the corresponding region 140*a* of the display panel 100, as described in relation to FIG. 9A. The image analysis circuit 340 is further configured to apply a filter to the target part selected for each subzone 120 to generate the filtered image part. The filter may have the filter coefficients defined as shown in FIG. 9B. The image analysis circuit 340 is further configured to determine the local brightness values of the respective subzones 120 based on the APLs of the filtered image parts generated for the respective subzones 120.

In other embodiments, the local brightness values of the respective subzones 120 may be determined to be the APLs of the subzones 120 calculated based on the input image data. Using the APLs of the subzones 120 as the local brightness values of the respective subzones 120 may however cause undesired changes in the brightness of the displayed image when an image element (or an object) with a high specified luminance level (e.g., the highest specified luminance level) moves in the vertical direction to cross the boundary between adjacent zones 110, which may be observed as flickering of the displayed image. By using the filtered image parts to determine the local brightness values of the respective subzones 120 as described above, such undesired changes that may occur when an image element with a high specified luminance level moves in the vertical direction may be effectively mitigated.

Figure 11A:
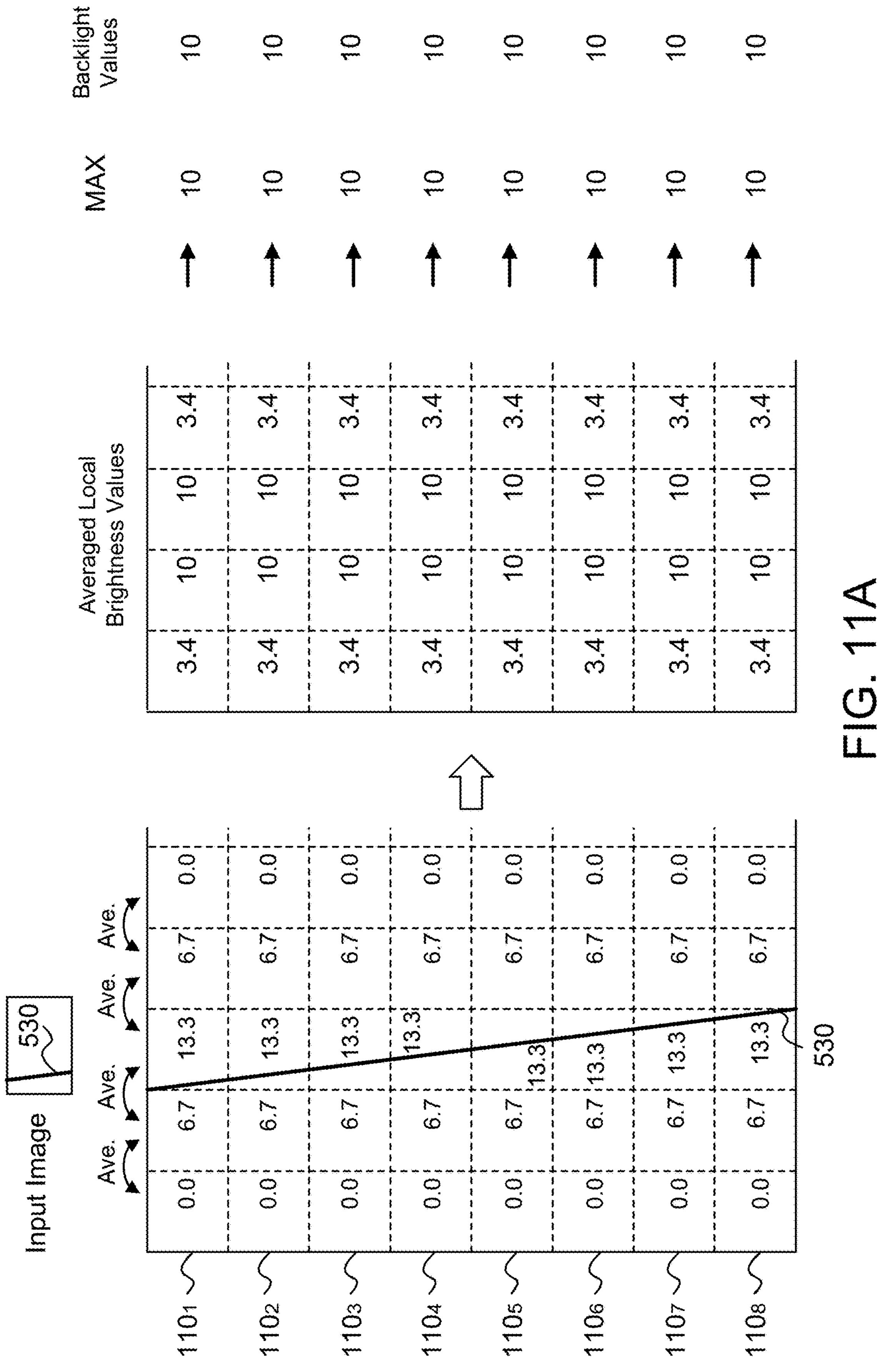
FIGS. 11A, 11B, and 11C show an example process for determining backlight values for respective light sources while an image element is moving, according to one or more embodiments.
Figure 11B:
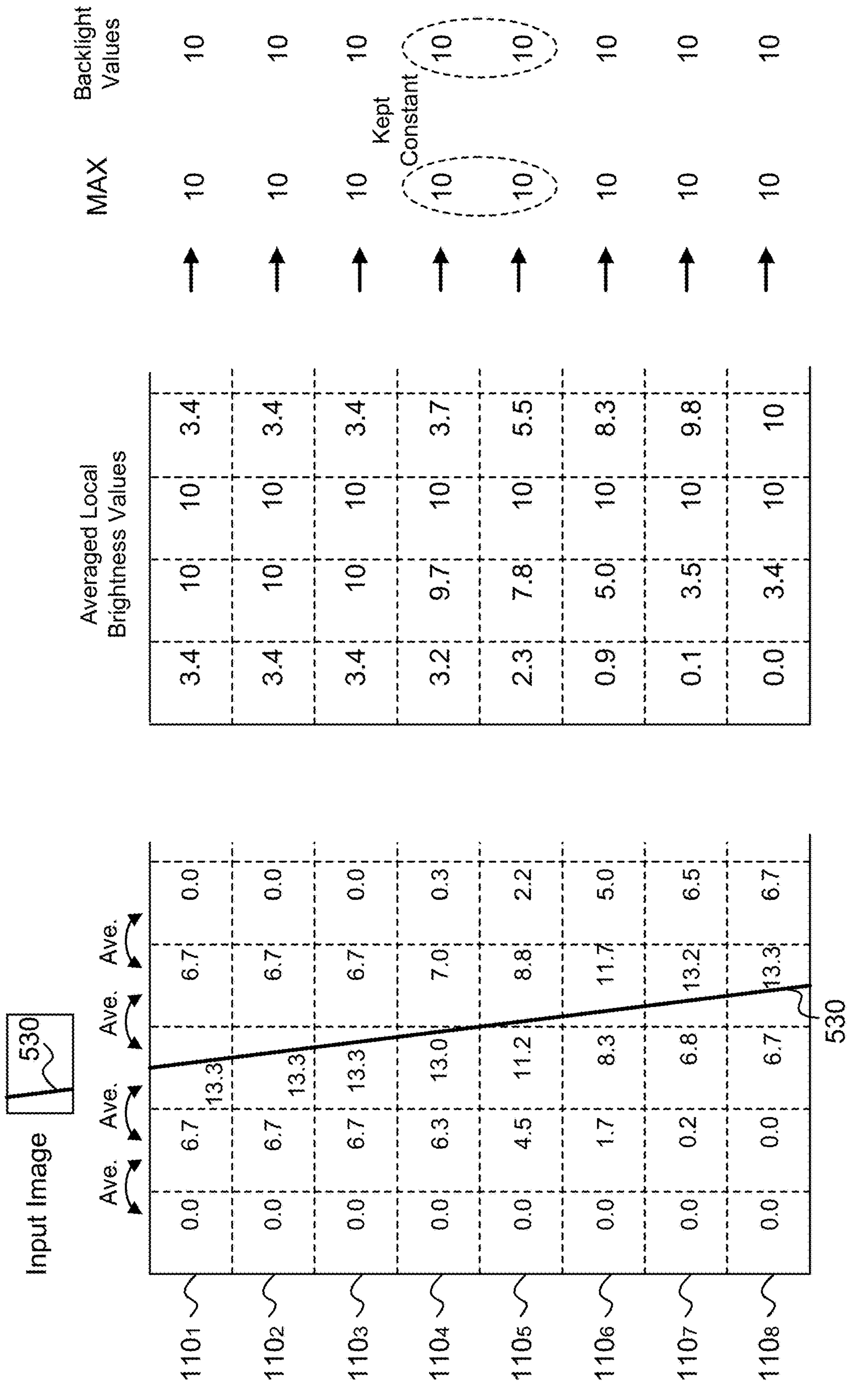
Figure 11C:
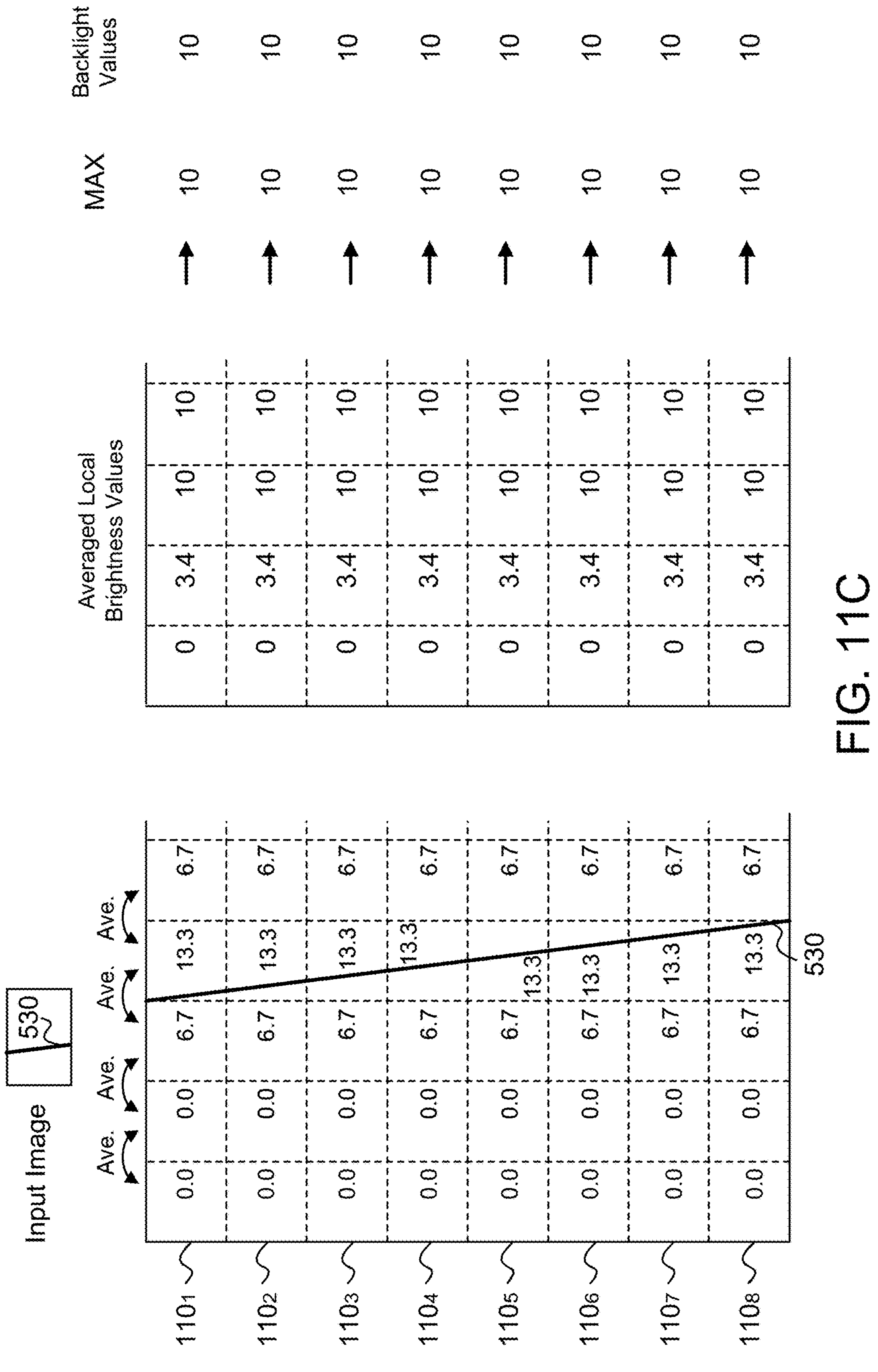

Referring back to FIG. 7, after determining the local brightness values of the respective subzones 120 in step 702, the image analysis circuit 340 averages the local brightness values determined for respective combinations of two or more adjacent ones of the subzones 120 in each zone 110 to determine averaged local brightness values for each zone 110 in step 704. FIGS. 11A, 11B, and 11C show an example of the averaging of the local brightness values, according to one or more embodiments. In the examples shown in FIGS. 11A, 11B, and 11C, the local brightness values are averaged with respect to respective combinations of two adjacent subzones 120 in each zone 110 to determine averaged local brightness values for that zone 110. In this case, the number of the averaged local brightness values for each zone 110 is less than the number of the subzones 120 in each zone 110 by one. For example, in implementations where the number of the subzones 120 in each zone 110 is 12, the number of the averaged local brightness values calculated for each zone 110 is 11.

In the example shown in FIG. 11A, the local brightness values of the five leftmost subzones 120 in the zone 1101 are calculated as 0.0, 6.7, 13.3, 6.7, and 0.0, respectively, and four averaged local brightness values are determined for the five leftmost subzones 120. The averaged local brightness value for the leftmost and second leftmost subzones 120 in the zone 1101 is calculated to be 3.4, which is almost equal to (0.0+6.7)/2. The averaged local brightness value for the second leftmost and third leftmost subzones 120 in the zone 1101 is calculated to be 10.0, which is almost equal to (6.7+13.3)/2. The averaged local brightness values for other combinations of two adjacent subzones 120 in the zone 1101 are calculated in a similar manner. Further, the averaged local brightness values for other zones 110 are calculated similarly to the averaged local brightness values for the zone 1101. In alternative implementations, the averaging of the local brightness values may be implemented for respective combinations of three or more adjacent ones of the subzones 120 in each zone 110 to determine averaged local brightness values for each zone 110.

Referring back to FIG. 7, in step 706, the image analysis circuit 340 determines the maximum value of the averaged local brightness values for each zone 110. The columns "MAX" in FIGS. 11A, 11B, and 11C respectively show examples of the determined maximum values of the averaged local brightness values for the respective zones 110.

In step 708, the image analysis circuit 340 further determines the base backlight value for each light source 210 based on the maximum value of the averaged local brightness values determined for the zone 110 corresponding to that light source 210. In one implementation, the image analysis circuit 340 determines the base backlight value for each light source 210 such that the base backlight value for a light source 210 of interest increases as the maximum value of the averaged local brightness values determined for the zone 110 corresponding to that light source 210 increases. The base backlight values determined for the respective light sources 210 are forwarded and stored in the 1D RAM 350 (shown in FIG. 6).

In step 710, the backlight value generation circuit 360 receives the base backlight values for the respective light sources 210 from the 1D RAM 350 and determine the backlight value for each light source 210 based on the base backlight value for each light source 210 and the display brightness value (DBV). In one implementation, the backlight value generation circuit 360 generates the backlight values for the respective light sources 210 by modifying the base backlight values based on the DBV. As described above, the DBV is a value that specifies a desired display brightness level of the panel display device 1000. In one implementation, the backlight value generation circuit 360 may be configured to generate the backlight values for the respective light sources 210 by multiplying the base backlight values by a multiplication factor determined based on the DBV. The backlight values thus generated are provided to the 1D backlight device 200 and used to control the respective light sources 210.

The right parts of FIGS. 11A, 11B, and 11C show an example result of determining the backlight values for the light sources 210 by the above-described process 700 in implementations where the input image containing the image element 530 is displayed, according to one or more embodiments. In the implementation shown in FIGS. 11A, 11B, and 11C, similarly to the case shown in FIGS. 5A, 5B, 5C, the image element 530 is initially located in the third leftmost column of the subzones 120 of the display panel 100 and is then moved to the interior of the fourth leftmost column of the subzones 120 after crossing the boundaries between the third and fourth columns of the subzones 120. As shown in FIGS. 11A, 11B, and 11C, the process 700 for determining the backlight values for the respective light sources 210 results in the maximum APLs of all the zones 110 being kept constant at "10" during the movement of the image element 530, thereby mitigating an undesirable decrease in the luminance of the image element 530.

Figure 12:
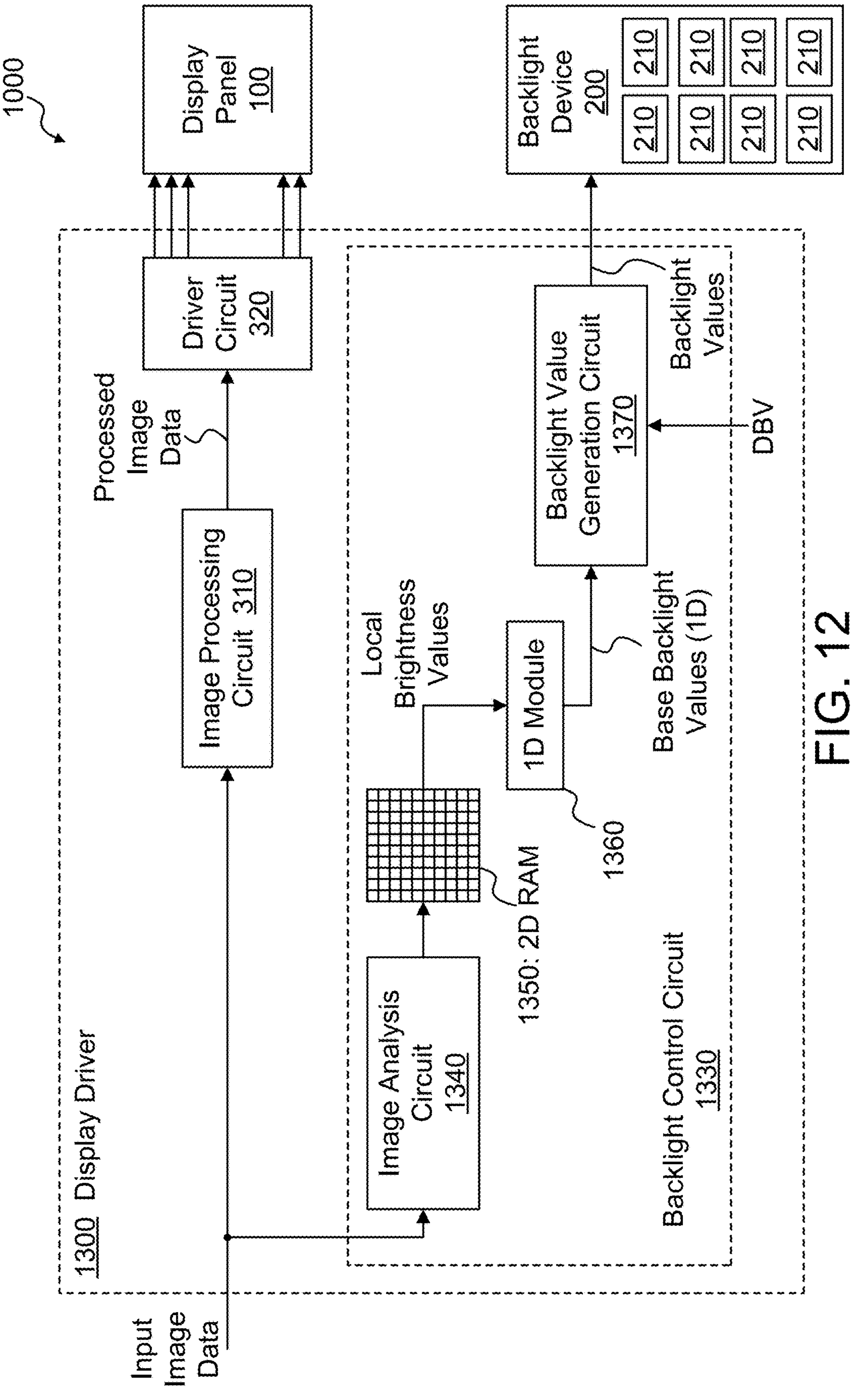
FIG. 12 shows an example configuration of a display driver, according to other embodiments.

FIG. 12 shows an example configuration of a display driver 1300 of the panel display device 1000, according to other embodiments. The display driver 1300 is configured similarly to the display driver 300 shown in FIG. 6, except that the display driver 1300 includes a backlight control circuit 1330 instead of the backlight control circuit 330. The backlight control circuit 1330 includes an image analysis circuit 1340, a 2D RAM 1350, a 1D module 1360, and a backlight value generation circuit 1370. The image analysis circuit 1340 is configured to analyze the input image data to generate local brightness values of the respective subzones 120. The process 800 described in relation to FIG. 8 may be used to generate the local brightness values of the respective subzones 120. The image analysis circuit 1340 is further configured to forward the local brightness values generated for the respective subzones 120 to the 2D RAM 1350. The 2D RAM 1350 is configured to store the local brightness values generated for the respective subzones 120 and sequentially forward the stored local brightness values to the 1D module 1360. The 1D module 1360 is configured to generate the base backlight values for the respective light sources 210 based on the local brightness values stored in the 2D RAM 1350. The base backlight values for the respective light sources 210 may be generated by implementing steps 704, 706, and 708 of the process 700 described in relation to FIG. 7. The backlight value generation circuit 1370 may be configured to generate the backlight values for the respective light source 210 by modifying the base backlight values based on the DBV. In implementations where the backlight value generation circuit 1370 stores demura data, the backlight value generation circuit 1370 may be configured to modify the base backlight values for the respective light sources 210 further based on the demura data to mitigate display mura.

Figure 13:
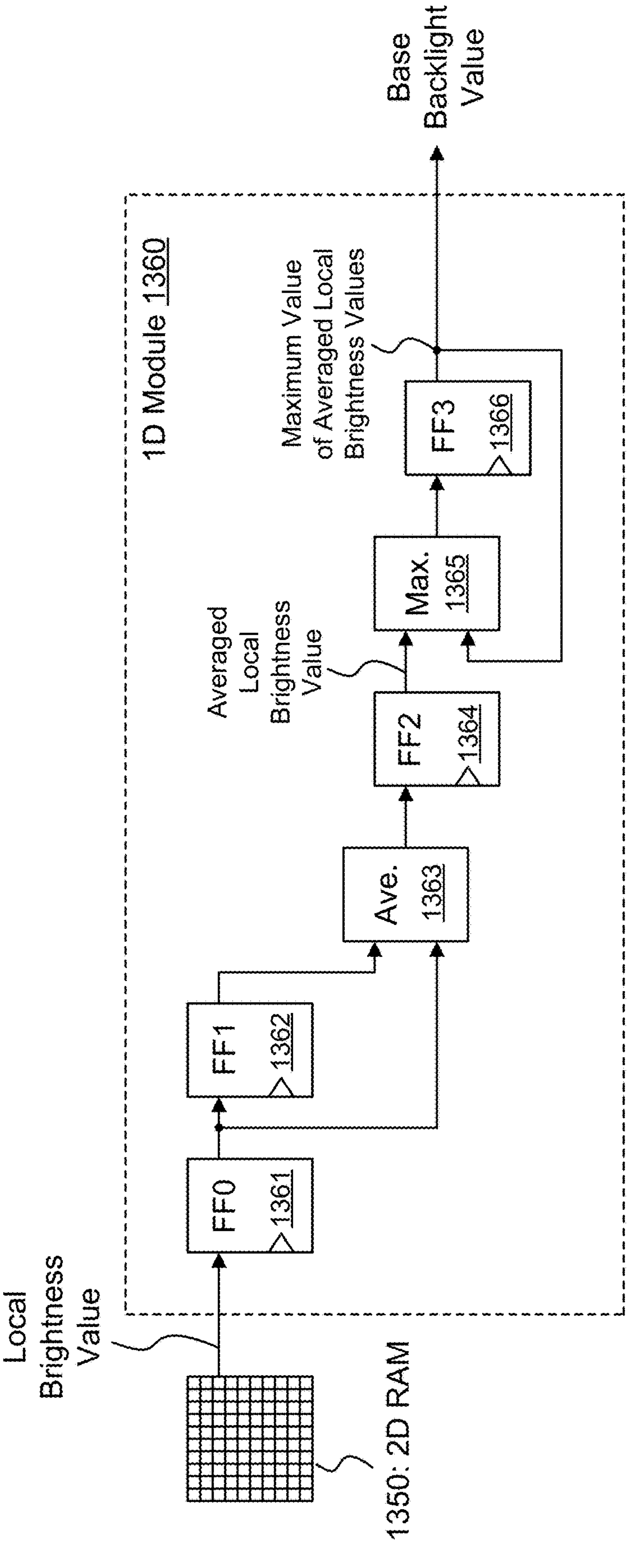
FIG. 13 shows an example configuration of a 1D module, according to one or more embodiments.

FIG. 13 shows an example configuration of the 1D module 1360, according to one or more embodiments. In the shown embodiment, the 1D module 1360 includes a flipflop FF0 1361, a flipflop FF1 1362, an averaging circuit 1363, a flipflop FF2 1364, a maximum value circuit 1365, and a flipflop FF3 1366. The flipflop FF0 1361 has a data input configured to sequentially receive the local brightness values from the 2D RAM 1350 and the flipflop FF1 1362 has a data input coupled to the data output of the flipflop FF0 1361 and is configured to output the local brightness values received from the flipflop FF0 1361 with a delay of one operation cycle (e.g., one clock cycle). The data outputs of the flipflops FF0 1361 and FF1 1362 are coupled to the inputs of averaging circuit 1363. The averaging circuit 1363 is configured to calculate the average of the local brightness values received from the flipflops FF0 1361 and FF1 1362. The flipflop FF2 1364 is configured to latch the output of the averaging circuit 1363 and forward the same to the maximum value circuit 1365. The maximum value circuit 1365 is configured to output a larger one of the outputs of the flipflop FF2 1364 and the flipflop FF3 1366. The flipflop FF3 1366 is configured to latch the output of the maximum value circuit 1365.

The 1D module 1360 thus configured sequentially receives and processes the local brightness values of the respective subzones 120 of each zone 110 to determine the base backlight value of the light source 210 corresponding to that zone 110. When the processing for determining the local brightness values of the subzones 120 of each zone 110 is completed, the output of the flipflop FF3 is the maximum value of the averaged local brightness values calculated for that zone 110, which is used as the base backlight value for the light source 210 corresponding to that zone 110, as described in detail below.

FIG. 14 is a timing diagram showing an example operation of the 1D module 1360 in processing the local brightness values of respective subzones 120 for each zone 110, according to one or more embodiments. In FIG. 14, B[i] denotes the local brightness value of the i-th leftmost subzone 120 of the zone 110 of interest, and "#i" denotes the i-th operation cycle (e.g., i-th clock cycle) in the processing for the zone 110 of interest. Initially, the value "m" stored in the flipflop FF3 1366 is zero.

During operation cycle #1, the 2D RAM 1350 outputs the local brightness value B[1] of the leftmost subzone 120. During operation cycle #2, the flipflop FF0 1361 latches the local brightness value B[1] from the 2D RAM 1350 while the 2D RAM 1350 outputs the local brightness value B[2] of the second leftmost subzone 120. During operation cycle #3, the flipflop FF1 1362 latches the local brightness value B[1] from the flipflop FF0 1361 and the flipflop FF0 1361 latches the local brightness value B[2] from the 2D RAM 1350, while the 2D RAM 1350 outputs the local brightness value B[3] of the third leftmost subzone 120.

During operation cycle #4, the averaging circuit 1363 calculates the average Bave[1] of the local brightness values B[1] and B[2]. Meanwhile, the flipflop FF1 1362 latches the local brightness value B[2] from the flipflop FF0 1361, and the flipflop FF0 1361 latches the local brightness value B[3] from the 2D RAM 1350, while the 2D RAM 1350 outputs the local brightness value B[4] of the fourth leftmost subzone 120.

During operation cycle #5, the maximum value circuit 1365 outputs a larger one of the output of the averaging circuit 1363 (i.e., the average Bave[1] of the local brightness values B[1] and B[2]) and the value "m" stored in the flipflop FF3 1366, and the value "m" stored in the flipflop FF3 1366 is updated with the output of the maximum value circuit 1365. Meanwhile, the averaging circuit 1363 calculates the average Bave[2] of the local brightness values B[2] and B[3]. Further, the flipflop FF1 1362 latches the local brightness value B[3] from the flipflop FF0 1361, and the flipflop FF0 1361 latches the local brightness value B[4] from the 2D RAM 1350, while the 2D RAM 1350 outputs the local brightness value B[5] of the fifth leftmost subzone 120.

During subsequent operation cycles, a similar process to that performed during operation cycle #5 is repeated. The process is repeated until the maximum value of the averaged local brightness values is obtained at the output of the flipflop FF3 1366.

The 1D module 1360 of the embodiment shown in FIG. 13 is configured to generate the averaged local brightness values for each zone 110 by averaging the local brightness values determined for respective combinations of two adjacent subzones 120 in that zone 110. In alternative embodiments, the 1D module 1360 may be configured to generate averaged local brightness values for each zone 110 by averaging the local brightness values determined for respective combinations of three or more adjacent subzones 120 in that zone 110. In such embodiments, the 1D module 1360 may include one or more additional flipflops serially coupled to the output of the flipflop FF1 1362, and the output(s) of the additional flipflop(s) may be coupled to the averaging circuit 1363.

While the display driver 1300 shown in FIG. 12 is configured to implement a local dimming function for the 1D backlight device 200 (shown in FIGS. 1 and 2), in alternative embodiments, a display driver may be configured to be capable of implementing a local dimming function for both a 1D backlight device and a 2D backlight device. The 2D backlight device referred to herein is a backlight device that includes a 2D light source array in which light sources are arranged in rows and columns. The display driver configuration adapted to both of the 1D backlight device and the 2D backlight device allows the display driver to be used in a larger number of display device products, effectively improving the usability of the display driver. The following describes an example configuration of a display device that includes a 2D backlight device and an example configuration of a display driver configured to be adaptable to both a 1D backlight device and a 2D backlight device.

Figure 15:
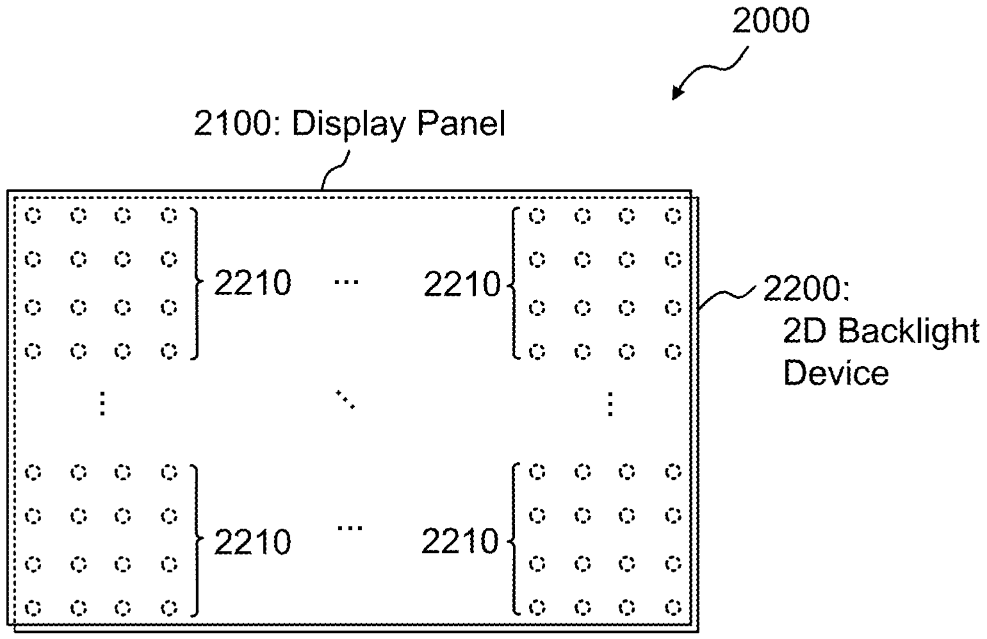
FIG. 15 shows an example configuration of a display device adapted for a local dimming function based on a 2D light source array, according to one or more embodiments.
Figure 16:
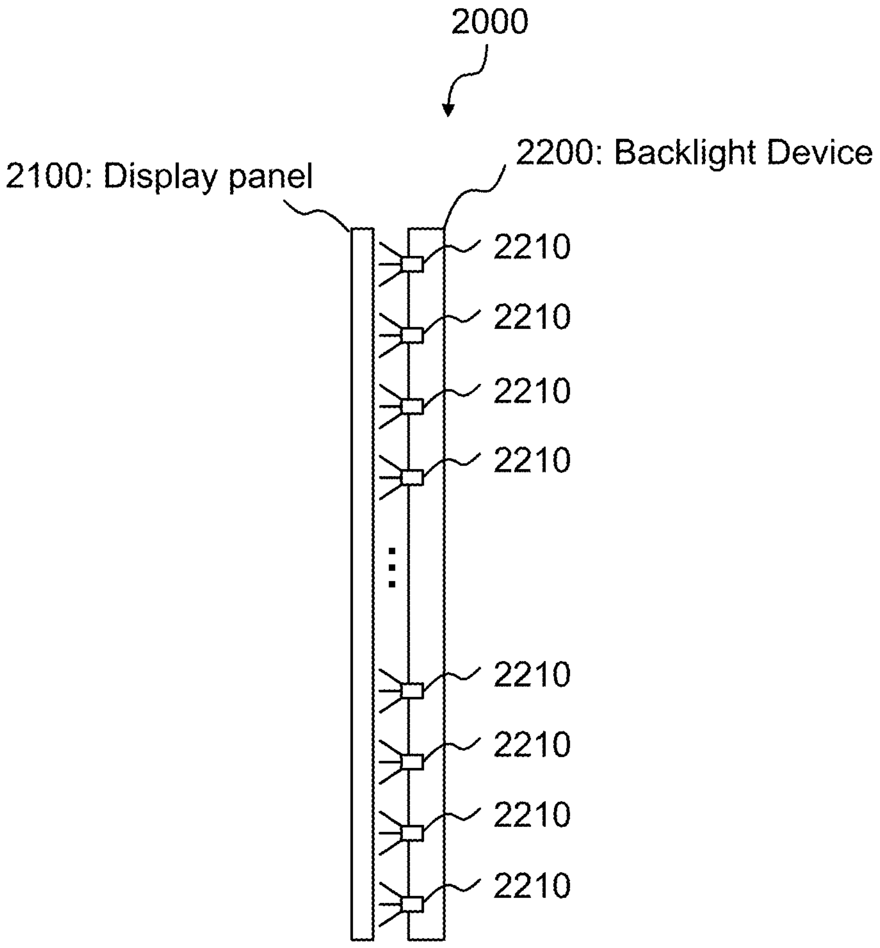
FIG. 16 shows a side view configuration of the display device shown in FIG. 15, according to one or more embodiments.

FIG. 15 shows an example configuration of a panel display device 2000 adapted for a local dimming function based on a 2D light source array, according to one or more embodiments. The panel display device 2000 includes a display panel 2100 and a two-dimensional (2D) backlight device 2200 configured to illuminate the display panel 2100. The display panel 2100 may be a light-transmissive display panel such as a liquid crystal display (LCD) panel. The 2D backlight device 2200 includes a 2D array of light sources 2210. Each light source 2210 may include one or more LEDs or different types of light sources. It is noted that the light sources 2210 are shown in phantom in FIG. 15 because the light sources 2210 are located behind the display panel 2100 as shown in FIG. 16, which shows a side view configuration of the panel display device 2000. While 64 light sources 2210 are shown in FIG. 15, those skilled in the art would appreciate that the 2D backlight device 2200 may include more or less than 64 light sources 2210.

Figure 17:
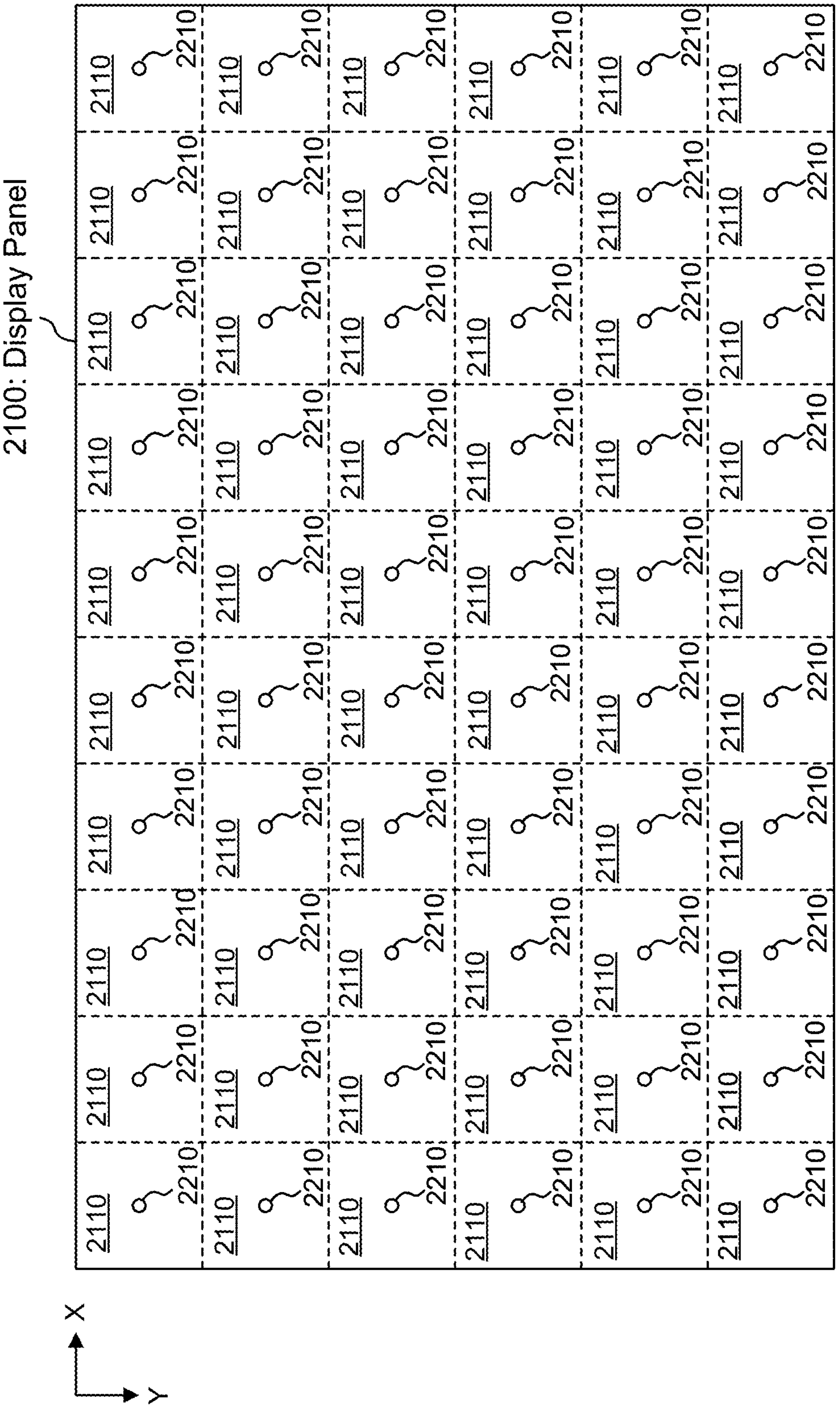
FIG. 17 shows an example arrangement of light sources of a 2D backlight device, according to one or more embodiments.

FIG. 17 shows an example arrangement of the light sources 2210 of the 2D backlight device 2200, according to one or more embodiments. In the shown embodiment, the display panel 2100 is segmented into zones 2110 arranged in rows and columns, and the light sources 2210 are located behind the corresponding zones 2110, respectively. The zones 2110 may be substantially rectangular. In one or more embodiments, the zones 2110 has a substantially square shape to reduce the aspect ratio of the zones 2110. Each light source 2210 is arranged such that the projection of each light source 2210 onto the display panel 2100 is positioned at the center (e.g., the geometric center) of the corresponding one of the zones 2110. As used herein, the "corresponding zone" 2110 of a light source 2210 refers to the zone 2110 that includes the projection of that light source 2210 onto the display panel 2100. It should be noted that due to the light diffusion characteristics of the light sources 2210, each light source 2210 primarily illuminates the corresponding zone 2110, but may secondarily illuminate at least portions of the zones 2110 around (e.g., adjacent to) the corresponding zone 2110.

Figure 18:
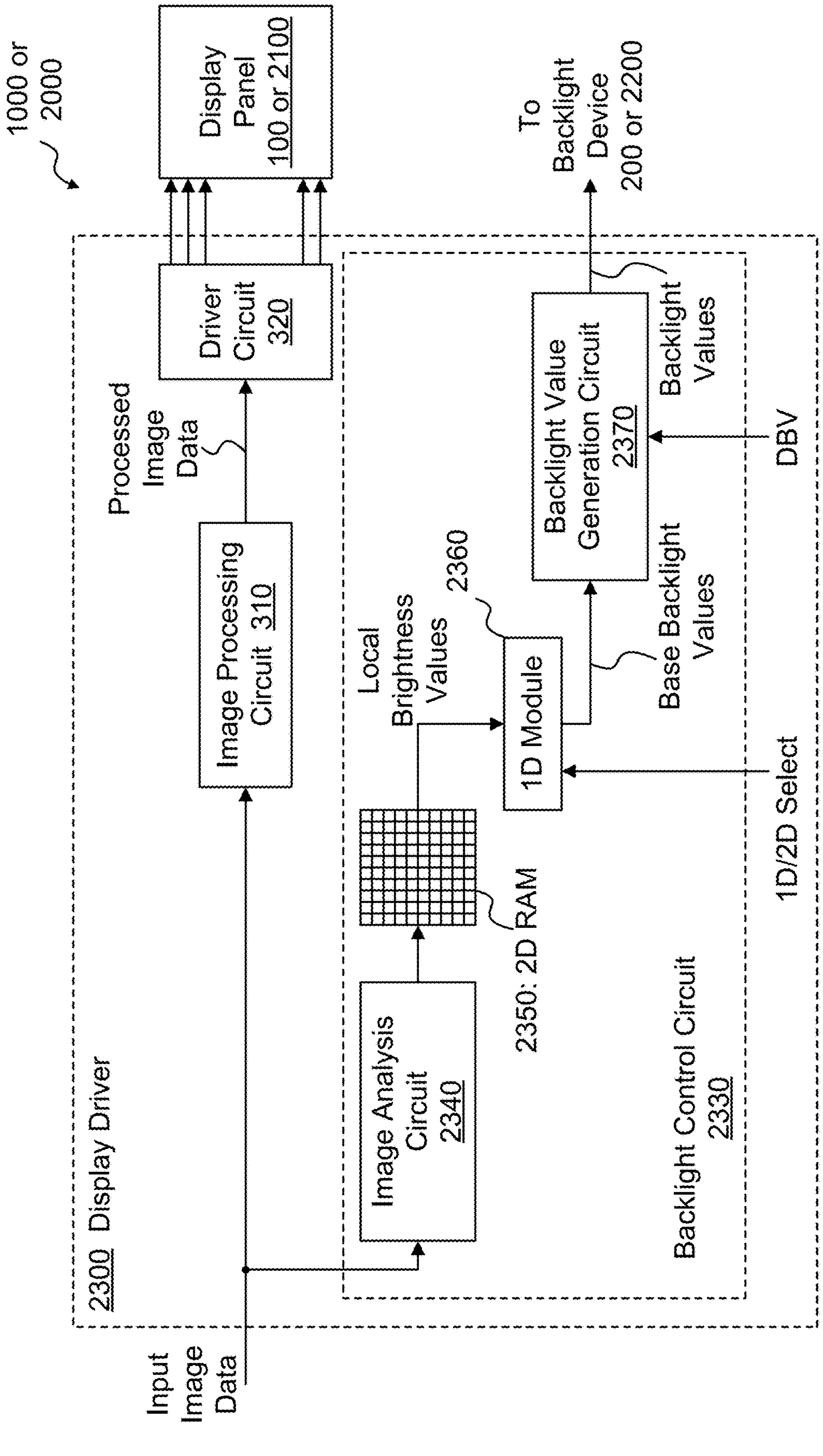
FIG. 18 shows an example configuration of a display driver, according to one or more embodiments.

FIG. 18 shows an example configuration of a display driver 2300 configured to be adapted to both the 1D backlight device 200 (shown in FIGS. 1 and 2) and the 2D backlight device 2200 (shown in FIGS. 15 and 16), according to one or more embodiments. The display driver 2300 is configured similarly to the display driver 1300 shown in FIG. 12, except that the display driver 2300 includes a backlight control circuit 2330 instead of the backlight control circuit 1330.

The backlight control circuit 2330 includes an image analysis circuit 2340, a 2D RAM 2350, a 1D module 2360, and a backlight value generation circuit 2370. The image analysis circuit 2340 is configured to generate, based on the input image data, the local brightness values of the respective subzones 120 of the display panel 100 when the display driver 2300 is used in the panel display device 1000 that includes the 1D backlight device 200. The image analysis circuit 2340 is further configured to generate, based on the input image data, local brightness values of the respective zones 2110 of the display panel 2100 when the display driver 2300 is used in the panel display device 2000 that includes the 2D backlight device 2200. In one or more embodiments, the local brightness values of the respective zones 2110 of the display panel 2100 are generated by a process similar to the process 800 of generating the local brightness values of the subzones 120 of the display panel 100 shown in FIG. 8. In one implementation, the image analysis circuit 2340 is configured to select target parts of the input image for the respective zones 2110 in a manner similar to that performed in step 802 of the process 800 and to filter the target parts to generate filtered image parts for the respective zones 2110 in a manner similar to that performed in step 804 of the process 800. The image analysis circuit 2340 is further configured to determine the local brightness values of the respective zones 2110 based on the APLs of the filtered image parts in a manner similar to that performed in step 806 of the process 800. The image analysis circuit 2340 is further configured to forward the local brightness values generated for the respective subzones 120 or the respective zones 2110 to the 2D RAM 2350. The 2D RAM 2350 is configured to store the local brightness values generated for the respective subzones 120 or the respective zones 2110 and to sequentially forward the stored local brightness values to the 1D module 2360.

The 1D module 2360 is configured to be responsive to a 1D/2D select signal for processing the local brightness values received from the 2D RAM 2350. The 1D/2D select signal indicates whether the display driver 2300 is in a 1D mode or 2D mode. The 1D mode is an operation mode in which the display driver 2300 is used in the panel display device 1000 that includes the 1D backlight device 200. The 2D mode is an operation mode in which the display driver 2300 is used in the panel display device 2000 that includes the 2D backlight device 2200. The 1D module 2360 is configured to generate, when the display driver 2300 is in the 1D mode, the base backlight values for the light sources 210 in a manner similar to that performed by the 1D module 1360 described in relation to FIG. 12. The 1D module 2360 is further configured to output, when the display driver 2300 is in the 2D mode, the local brightness values determined for the respective zones 2110 as the base backlight values for the respective light sources 2210 without modification. More specifically, in the 2D mode, the local brightness value determined for a zone 2110 of interest is used as the base backlight value for the light source 2210 corresponding to that zone 2110 without modification.

Figure 19:
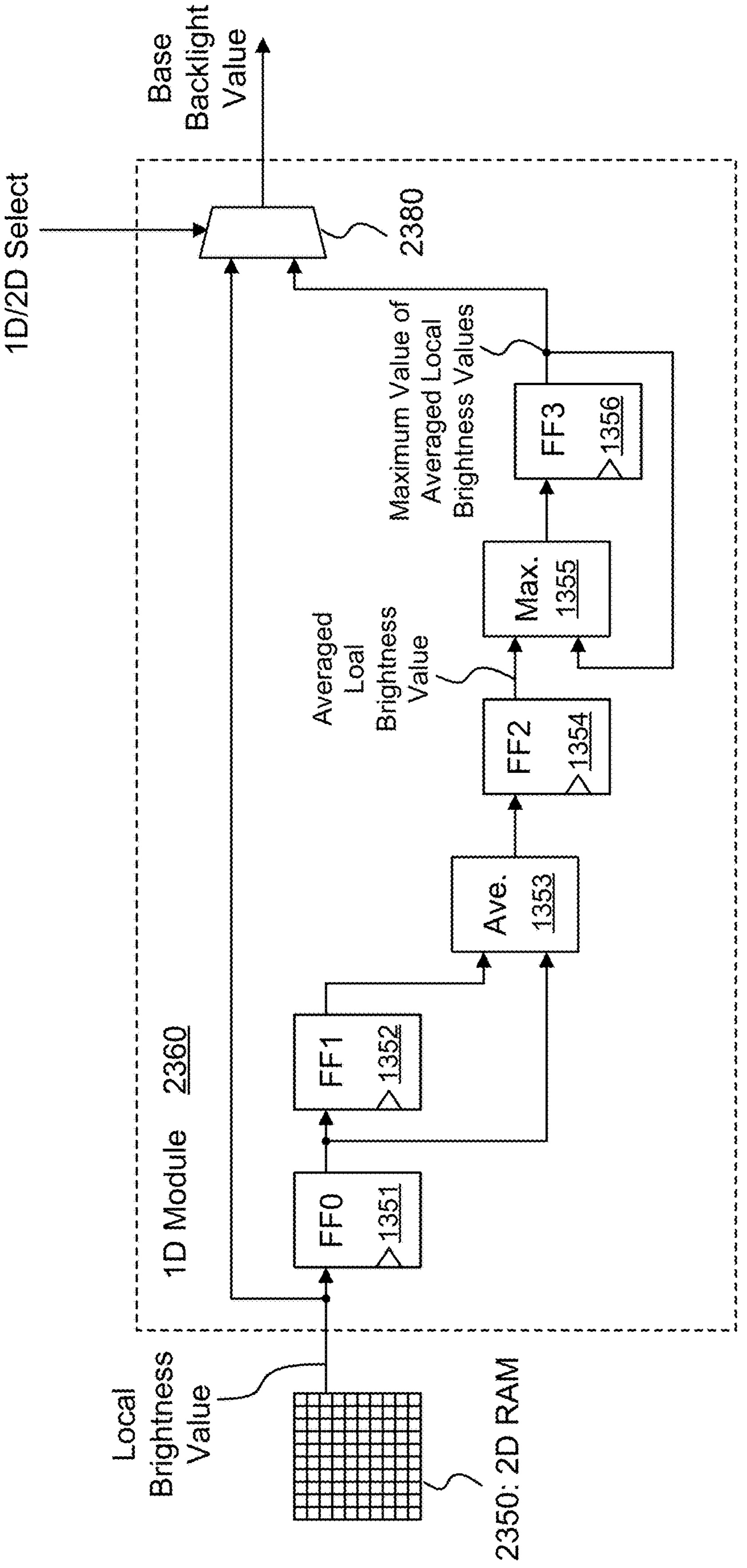
FIG. 19 shows an example configuration of a 1D module, according to one or more embodiments.

FIG. 19 shows an example configuration of the 1D module 2360, according to one or more embodiments. The 1D module 2360 is configured similarly to the 1D module 1360 shown in FIG. 13, except that the 1D module 2360 further includes a selector 2380 configured to select the output of the 2D RAM 2350 and the output of the flipflop FF3 1356 in response to the 1D/2D select signal. When the 1D/2D select signal indicates that the display driver 2300 is in the 1D mode, the selector 2380 selects the output of the flipflop FF3 1356. In this case, the base backlight value of each light source 210 is determined to be equal to the maximum value of the averaged local brightness values calculated for the zone 110 corresponding to that light source 210. When the 1D/2D select signal indicates that the display driver 2300 is in the 2D mode, the selector 2380 selects the output of the 2D RAM 2350. In this case, the base backlight value for each light source 2210 is determined to be equal to the local brightness value of the zone 2110 corresponding to that light source 2210.

Referring back to FIG. 18, the backlight value generation circuit 2370 is configured to generate the backlight values for the respective light sources 210 of the 1D backlight device 200 or the respective light sources 2210 of the 2D backlight device 2200 by modifying the base backlight values based on the DBV. In implementations where the backlight value generation circuit 2370 stores demura data, the backlight value generation circuit 2370 may be configured to modify the base backlight values for the respective light sources 210 or 2210 further based on the demura data to mitigate display mura.

The configuration of the display driver 2300 shown in FIG. 18, which is adapted to both of the 1D backlight device 200 and the 2D backlight device 2200, effectively improves the usability of the display driver 2300.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A display device, comprising:

a backlight device comprising a plurality of light sources configured to illuminate a plurality of zones of a display panel, respectively, the plurality of zones being aligned in a first direction, each of the plurality of zones comprising a plurality of subzones aligned in a second direction perpendicular to the first direction; and a backlight control circuit configured to:

receive an input image; and determine a backlight value for a target light source of the plurality of light sources, the target light source corresponding to a target zone of the plurality of zones;

wherein determining the backlight value for the target light source comprises:

determining local brightness values of respective subzones of the target zone based on the input image; and determining the backlight value for the target light source based on the local brightness values of the subzones of the target zone;

wherein determining the local brightness values of the respective subzones comprises:

selecting target parts of the input image for the respective subzones of the target zone:

filtering the target parts to generate filtered image parts for the respective subzones; and determining the local brightness values of the respective subzones based on the filtered image parts.

2. The display device of claim 1, wherein the plurality of zones have a substantially rectangular shape that extends in the second direction; and wherein the subzones have a substantially square shape.

3. The display device of claim 1, wherein determining the local brightness values of the respective subzones comprises:

calculating average picture levels (APL) of the respective filtered image parts; and determining the local brightness values of the respective subzones based on the APLs.

4. The display device of claim 1, wherein filtering the target parts comprises applying filter coefficients to pixel luminance levels of pixels of the target parts of the input image:

wherein the filter coefficients applied to the pixel luminance levels of the pixels of a respective one of the target parts selected for a respective one of the subzones are defined depending on respective distances between the pixels of the respective one of the target parts and a center of the respective one of the subzones.

5. The display device of claim 1, wherein determining the backlight value for the target light source further comprises:

averaging the local brightness values determined for respective combinations of two or more adjacent ones of the subzones to determine averaged local brightness values; and determining the backlight value for the target light source based on the averaged local brightness values.

6. The display device of claim 5, wherein determining the backlight value for the target light source is based on a maximum value of the averaged local brightness values.

7. The display device of claim 1, further comprising:

a light guide plate having a major surface attached to a rear surface of the display panel;

wherein the plurality of light sources is attached to a side face of the light guide plate.

8. A display driver, comprising:

a driver circuit configured to drive a display panel based on an input image, wherein the display panel is illuminated by a backlight device comprising a plurality of light sources aligned in a first direction and configured to illuminate a plurality of zones of the display panel, respectively, each of the plurality of zones comprising a plurality of subzones aligned in a second direction perpendicular to the first direction; and a backlight control circuit configured to determine a backlight value for a target light source of the plurality of light sources, the target light source corresponding to a target zone of the plurality of zones:

wherein determining the backlight value for the target light source comprises:

determining local brightness values of respective subzones of the target zone based on the input image; and determining the backlight value for the target light source based on the local brightness values of the subzones of the target zone;

wherein determining the local brightness values of the respective subzones comprises:

selecting target parts of the input image for the respective subzones of the target zone;

filtering the target parts to generate filtered image parts for the respective subzones; and determining the local brightness values of the respective subzones based on the filtered image parts.

9. The display driver of claim 8, wherein the plurality of zones have a substantially rectangular shape that extends in the second direction; and wherein the subzones have a substantially square shape.

10. The display driver of claim 8, wherein filtering the target parts comprises applying filter coefficients to pixel luminance levels of pixels of the target parts of the input image;

wherein the filter coefficients applied to the pixel luminance levels of the pixels of a respective one of the target parts selected for a respective one of the subzones are defined depending on respective distances between the pixels of the respective one of the target parts and a center of the respective one of the subzones.

11. The display driver of claim 8, wherein determining the backlight value for the target light source further comprises:

averaging the local brightness values determined for respective combinations of two or more adjacent ones of the subzones to determine averaged local brightness values; and determining the backlight value for the target light source based on the averaged local brightness values.

12. The display driver of claim 11, wherein determining the backlight value for the target light source is based on a maximum value of the averaged local brightness values.

13. The display driver of claim 8, wherein the backlight control circuit comprises a memory configured to store the local brightness values of the respective subzones of the target zone.

14. The display driver of claim 13, wherein the driver circuit is further configured to drive a second display panel based on a second input image, the second display panel comprising a plurality of second zones arrayed in rows and columns, the plurality of second zones being illuminated by a plurality of second light sources, respectively; and wherein the backlight control circuit is further configured to:

determine second local brightness values of the plurality of second zones, respectively, based on the second input image;

store the second local brightness values in the memory; and determine second backlight values for the plurality of second light sources based on the second local brightness values.

15. A method, comprising:

illuminating, by a display device comprising a plurality of light sources, a plurality of zones of a display panel, wherein the plurality of light sources respectively illuminate the plurality of zones, wherein the plurality of zones are aligned in a first direction, and wherein each of the plurality of zones comprises a plurality of subzones aligned in a second direction perpendicular to the first direction;

receiving, by the display device, an input image; and determining, by the display device, a backlight value for a target light source of the plurality of light sources, the target light source corresponding to a target zone of the plurality of zones:

wherein determining the backlight value for the target light source comprises:

determining local brightness values of respective subzones of the target zone based on the input image; and determining the backlight value for the target light source based on the local brightness values of the subzones of the target zone;

wherein determining the local brightness values of the respective subzones comprises:

selecting target parts of the input image for the respective subzones of the target zone;

filtering the target parts to generate filtered image parts for the respective subzones; and determining the local brightness values of the respective subzones based on the filtered image parts.

16. The method of claim 15, wherein the plurality of zones have a substantially rectangular shape that extends in the second direction; and wherein the subzones have a substantially square shape.

17. The method of claim 15, wherein determining the backlight value for the target light source further comprises:

averaging the local brightness values determined for respective combinations of two or more adjacent ones of the subzones to determine averaged local brightness values; and determining the backlight value for the target light source based on the averaged local brightness values.

18. The method of claim 17, wherein determining the backlight value for the target light source is based on a maximum value of the averaged local brightness values.

19. The method of claim 15, wherein determining the local brightness values of the respective subzones comprises:

calculating average picture levels (APL) of the respective filtered image parts; and determining the local brightness values of the respective subzones based on the APLs.

20. The method of claim 15, wherein filtering the target parts comprises applying filter coefficients to pixel luminance levels of pixels of the target parts of the input image;

wherein the filter coefficients applied to the pixel luminance levels of the pixels of a respective one of the target parts selected for a respective one of the subzones are defined depending on respective distances between the pixels of the respective one of the target parts and a center of the respective one of the subzones.

* * * * *